(12) United States Patent
Kollu et al.

(10) Patent No.: US 10,684,976 B1
(45) Date of Patent: Jun. 16, 2020

(54) AUTOMATIC BUS RESOURCE ADJUSTMENT IN A MULTIPLE ROOT BRIDGE COMPUTING SYSTEM

(71) Applicant: American Megatrends International, LLC, Norcross, GA (US)

(72) Inventors: Naresh Kollu, Duluth, GA (US); Harikrishna Doppalapudi, Norcross, GA (US)

(73) Assignee: American Megatrends International, LLC, Norcross, GA (US)

( * ) Notice: Subject to any disclaimer, the term of this patent is extended or adjusted under 35 U.S.C. 154(b) by 0 days.

(21) Appl. No.: 16/029,774

(22) Filed: Jul. 9, 2018

(51) Int. Cl.
*G06F 13/42* (2006.01)
*G06F 13/40* (2006.01)

(52) U.S. Cl.
CPC ...... *G06F 13/4027* (2013.01); *G06F 13/4022* (2013.01); *G06F 13/4221* (2013.01); *G06F 2213/0024* (2013.01)

(58) Field of Classification Search
None
See application file for complete search history.

(56) References Cited

U.S. PATENT DOCUMENTS

| 2004/0168004 A1 | 8/2004 | Mudusuru | |
|---|---|---|---|
| 2016/0267035 A1* | 9/2016 | Murphy | G06F 13/368 |
| 2017/0329735 A1* | 11/2017 | Garg | G06F 13/4022 |
| 2018/0060266 A1* | 3/2018 | Garibay | G06F 13/4081 |
| 2018/0321964 A1* | 11/2018 | Tsuji | G06F 9/4411 |

* cited by examiner

*Primary Examiner* — Ilwoo Park
(74) *Attorney, Agent, or Firm* — Newport IP, LLC; Leonard J. Hope

(57) ABSTRACT

A firmware enumerates the buses of root bridges in the computing system. If an OOR condition occurs during enumeration of the buses, the firmware determines the number of required buses for each root bridge causing an OOR condition. The number of required buses for bridge devices connected to each root bridge causing an OOR condition can be identified using the same set of bus numbers. Once the firmware has determined the number of buses required by each root bridge, including those not causing an OOR condition, the firmware reallocates the number of available buses between the root bridges such that each root bridge is allocated a number of the available buses greater than or equal to the number of required buses. The firmware stores data identifying the allocation and restarts the computing device. Upon rebooting, the computing system utilizes the new allocation of bus numbers to eliminate the OOR condition.

18 Claims, 21 Drawing Sheets

PCI MEMORY ADDRESS SPACE AND CONFIGURATION ADDRESS SPACE

| | CPU0/RB0 | CPU0/RB1 | CPU0/RB2 | CPU0/RB3 |
|---|---|---|---|---|
| ORIGINAL ALLOC. | 16 | 16 | 16 | 16 |
| REQUIRED ALLOC. | 20 | 16 | 8 | 16 |
| ADJUSTED ALLOC. | 20 | 16 | 12 | 16 |

EXAMPLE - SINGLE ROOT BRIDGE ALLOCATION FAILURE (SINGLE CPU)

FIG. 6A

| | CPU0/RB0 | CPU0/RB1 | CPU0/RB2 | CPU0/RB3 |
|---|---|---|---|---|
| ORIGINAL ALLOC. | 16 | 16 | 16 | 16 |
| REQUIRED ALLOC. | 16 | 22 | 17 | 6 |
| ADJUSTED ALLOC. | 16 | 22 | 17 | 9 |

EXAMPLE - MULTIPLE ROOT BRIDGE ALLOCATION FAILURE (SINGLE CPU)

FIG. 6B

| | CPU0/RB0 | CPU0/RB1 | CPU0/RB2 | CPU0/RB3 | CPU1/RB0 | CPU1/RB1 | CPU1/RB2 | CPU1/RB3 |
|---|---|---|---|---|---|---|---|---|
| ORIGINAL ALLOC. | 16 | 16 | 16 | 16 | 16 | 16 | 16 | 16 |
| REQUIRED ALLOC. | 16 | 22 | 15 | 6 | 16 | 19 | 17 | 6 |
| ADJUSTED ALLOC. | 16 | 22 | 16 | 10 | 16 | 19 | 17 | 12 |

EXAMPLE - MULTIPLE ROOT BRIDGE ALLOCATION FAILURE (MULTIPLE CPUS)

FIG. 6C

SEGMENT 0

| | CPU0/RB0 | CPU0/RB1 | CPU0/RB2 | CPU0/RB3 | CPU1/RB0 | CPU1/RB1 | CPU1/RB2 | CPU1/RB3 |
|---|---|---|---|---|---|---|---|---|
| ORIGINAL ALLOC. | 32 | 32 | 32 | 32 | 32 | 32 | 32 | 32 |
| REQUIRED ALLOC. | 12 | 40 | 16 | 44 | 24 | 36 | 24 | 48 |
| ADJUSTED ALLOC. | 20 | 40 | 20 | 44 | 24 | 36 | 24 | 48 |

SEGMENT 1

| | CPU2/RB0 | CPU2/RB1 | CPU2/RB2 | CPU2/RB3 | CPU3/RB0 | CPU3/RB1 | CPU3/RB2 | CPU3/RB3 |
|---|---|---|---|---|---|---|---|---|
| ORIGINAL ALLOC. | 32 | 32 | 32 | 32 | 32 | 32 | 32 | 32 |
| REQUIRED ALLOC. | 48 | 24 | 36 | 44 | 16 | 40 | 12 |
| ADJUSTED ALLOC. | 48 | 24 | 36 | 44 | 20 | 40 | 20 |

EXAMPLE - MULTIPLE ROOT BRIDGE ALLOCATION FAILURE
ACROSS MULTIPLE PCI SEGMENTS

FIG. 6D

AUTOMATIC BUS RESOURCE ADJUSTMENT IN A MULTIPLE ROOT BRIDGE COMPUTING SYSTEM

BACKGROUND

Modern computer systems typically include one or more buses for interconnecting system components and for communicating with one or more processors. For instance, many modern desktop and server computer systems utilize the Peripheral Component Interconnect ("PCI") Bus Architecture Standard. Through the PCI buses in a computer system, communication can be made between devices, system memory, and the host processor(s).

Due to limitations on the number of devices that may be present on a single PCI bus imposed by the PCI Bus Architecture Standard, and for performance-related reasons, many computer systems utilize multiple PCI buses. Buses can be added to an existing bus using devices called PCI-to-PCI bridges ("PPBs," "bridges," or "bridge devices"). PPBs provide connectivity between a primary, or upstream bus, and a secondary, or downstream, bus. Many of today's desktop and server computer systems contain multiple PPBs and, therefore, may have many buses. For instance, several PPBs may be utilized on the system mainboard, and additional PPBs may be installed on add-on adapter cards.

In order to enable access to the devices connected to each bus in a computer system, each bus must be given a unique bus number. The firmware utilized in systems with PCI bus architectures numbers the buses present in a system at startup according to the PCI Bus Architecture Standard. Such firmware typically begins assigning PCI bus numbers starting from bus zero because the firmware is only aware of the existence of PCI bus zero, the first bus number detected on the primary PCI bus. The firmware detects any additional buses and allocates bus numbers to each PPB it detects during system initialization. By utilizing the bus numbers assigned by the firmware, the operating system executing on the computer can identify and communicate with all the devices within a system, including those located downstream of PPBs.

Some computing systems have multiple processor "sockets," each of which corresponds to a central processing unit ("CPU" or "processor") present in the computing system. Each socket can also have multiple root bridges. A root bridge connects a primary PCI bus (e.g. bus zero), to a secondary PCI bus (e.g. PCI bus one). In turn, each root bridge can have multiple devices connected to it, including multiple PPBs.

As one example, a computing system might have four processors with four root bridges per processor. In this configuration, resources such as bus numbers must be allocated to the buses coupled to 16 different root bridges. The number of available bus numbers is, however, commonly restricted to 256 in a single segment. The total number of available buses (e.g. 256) are also commonly pre-allocated equally to the root bridges in a computing system. In the example configuration above, for instance, each root bridge would be pre-allocated 16 buses. During enumeration, the bus numbers pre-allocated to a root bridge are assigned to devices coupled to that root bridge.

If the number of actual buses coupled to a root bridge exceeds the number of buses pre-allocated to that root bridge, then it will not be possible to assign resources to some of the bridge devices coupled to the root bridge. This would occur, for instance, in a configuration where 16 bus numbers are pre-allocated to a root bridge, but the root bridge is coupled to more than 16 buses. As a result, a bus out-of-resource ("OOR") condition will occur, the bridge devices to which bus numbers could not be allocated will be unavailable, and the computing system might exhibit non-deterministic behavior.

It is with respect to these and other considerations that the disclosure made herein is presented.

SUMMARY

Technologies for automatic bus resource adjustment in multiple root bridge computing systems are disclosed herein. Through an implementation of the disclosed technologies, the amount of bus numbers originally allocated to bridge devices can be automatically adjusted in the event of an OOR condition, particularly where it is not possible to assign bus numbers to all of the bridge devices coupled to a root bridge. Through such an adjustment, bus numbers can be reallocated to bridge devices, thereby preventing an OOR condition in some scenarios. This can reduce or even eliminate the possibility that bus devices will be unavailable and that a computing system will exhibit non-deterministic behavior. Other technical benefits can also be realized through an implementation of the disclosed technologies.

In one implementation, a firmware, such as a Unified Extensible Firmware Interface ("UEFI") Specification-compliant firmware, executes on a computing system having one or more CPUs (e.g. one, two, four, etc.). The firmware provides various types of functionality including, but not limited to, enumerating the devices on buses in the computing system, such as PCI buses, and allocating resources to devices on the buses. For example, the firmware can allocate bus numbers to bridge devices coupled to root bridges in the computing system. As discussed above, an equal number of the available buses are commonly allocated to each of root bridge during startup of a computing device.

In one implementation, the firmware enumerates the buses of the root bridges in a computing system implementing the technologies disclosed herein. As mentioned above, the firmware might encounter an OOR condition during the enumeration of the buses. Responsive to determining that at least one OOR condition occurred during enumeration of the buses of the root bridges, the firmware determines the number of required buses for each root bridge that caused an OOR condition during enumeration of the buses of the root bridges. The firmware can then reallocate the number of available buses between the root bridges such that each root bridge is allocated a number of the available buses greater than or equal to the number of required buses.

In some implementations, the number of required buses for a root bridge causing an OOR condition is determined by first enumerating the bridge devices coupled a root bridge causing an OOR condition. The bridges devices are enumerated using depth-first traversal of the device tree. When a bridge device is found, the firmware programs the primary, secondary, and subordinate bus numbers for the current bridge device and any bridge devices under the current bridge device. Once the number of required buses for the current bridge device have been found, the firmware stores data identifying the number of required buses for the current bridge device.

The firmware then clears the primary, secondary, and subordinate bus numbers for the current bridge device and any bridges under the current bridge device. The same bus numbers are then utilized to determine the bus requirements for other bridge devices under the root bridge causing an OOR condition. Data identifying the total number of buses required for the root bridge causing the OOR condition can then be stored. This process can be repeated for each root bridge causing an OOR condition. The number of buses required by root bridges not causing an OOR condition can be determined by enumerating the buses on those root bridges in the ordinary manner.

Once the firmware has determined the number of buses required by each root bridge, including those causing an OOR condition, the firmware can reallocate the number of available buses between the root bridges such that each root bridge is allocated a number of the available buses greater than or equal to the number of required buses. The firmware can store data identifying the allocation in a non-volatile memory and restart the computing device following the reallocation of the number of available buses between the plurality of root bridges. Upon rebooting, the computing system will utilize the new allocation of bus numbers, thereby eliminating the OOR condition.

In some embodiments, a computing device implementing the technologies disclosed herein includes a single processor having multiple root bridges coupled thereto. In this embodiment, a single one of the root bridges coupled to the processor generates an OOR condition during the enumeration of the buses. The embodiments disclosed herein can reallocate the available buses to eliminate the OOR condition in this scenario.

In other embodiments, a computing device implementing the technologies disclosed herein includes a single processor having multiple root bridges coupled thereto. In this embodiment, two or more of the root bridges coupled to the processor generate an OOR condition during the enumeration of the buses. The embodiments disclosed herein can also reallocate the available buses to eliminate the OOR condition in this scenario.

In other embodiments, a computing device implementing the technologies disclosed herein includes multiple processors, each of which has multiple root bridges coupled thereto. In this embodiment, one or more of the root bridges coupled to each processor generates an OOR condition during the enumeration of the buses. The embodiments disclosed herein can also reallocate the available buses to eliminate the OOR condition in this scenario.

In other embodiments, a computing device implementing the technologies disclosed herein includes at least one processor coupled to root bridges on a first segment and root bridges on a second segment. In this embodiment, at least one of the root bridges on one of the segments generates an OOR condition during enumeration of the buses. The embodiments disclosed herein can also reallocate the available buses to eliminate the OOR condition in this scenario.

The summary of the disclosed subject matter provided above is intended to introduce a selection of concepts in a simplified form that are further described below in the Detailed Description. This summary is not intended to identify key features or essential features of the claimed subject matter, nor is it intended that this summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A-6D are bus number diagrams showing an original allocation of bus numbers, a required allocation of bus numbers, and an allocation of bus numbers that has been adjusted using the technologies disclosed herein in several different illustrative scenarios;

DETAILED DESCRIPTION

Figure 1:
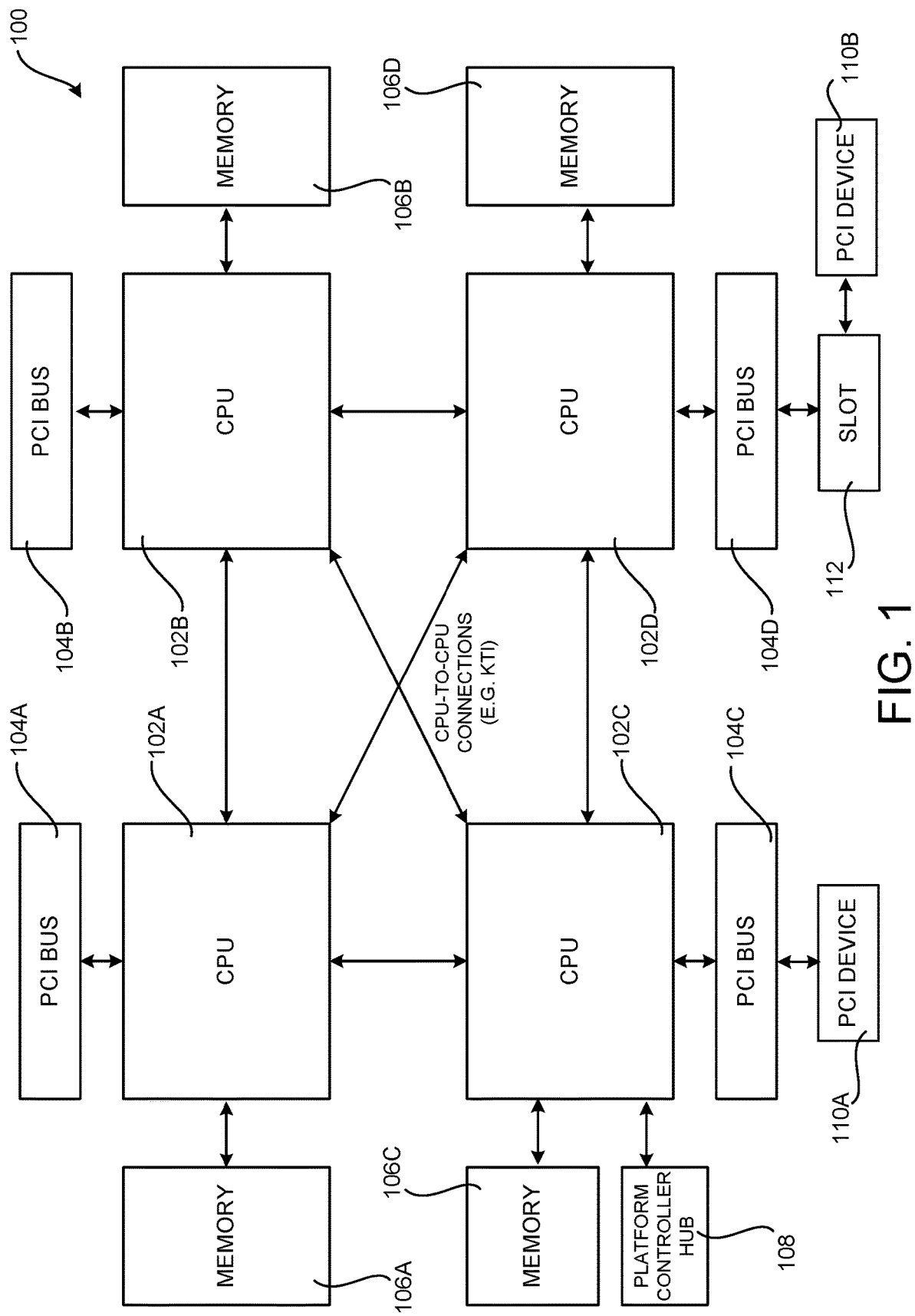
FIG. 1 is a computer architecture diagram that shows an illustrative configuration for a computing system that can be utilized to implement aspects of the technologies disclosed herein, according to one embodiment.

The following detailed description is directed to technologies for automatic bus resource adjustment in a multiple root bridge computing system. In the following detailed description, references are made to the accompanying drawings that form a part hereof, and in which are shown by way of illustration specific configurations or examples. Referring now to the drawings, in which like numerals represent like elements throughout the several FIGS., aspects of an exemplary operating environment and the various technologies provided herein will be described.

While the configurations presented herein are described in the general context of program modules that execute in conjunction with the execution of a computer firmware, those skilled in the art will recognize that various configurations can also be implemented in combination with other program modules. Generally, program modules include routines, programs, components, data structures, and other types of structures that perform tasks or implement abstract data types.

Those skilled in the art will appreciate that the invention can be practiced with other computer system configurations having multiple processors and at least one bus. Configurations presented herein can also be practiced in distributed computing environments where tasks are performed by remote processing devices that are linked through a communications network. In a distributed computing environment, program modules can be located in both local and remote memory storage devices.

FIG. 1 is a computer architecture diagram that illustrates aspects of a computing system 100 that can be utilized to implement the technologies disclosed herein, according to one embodiment. The computing system 100 has multiple CPUs 102A-102D (which might be referred to as a CPU 102 or the CPUs 102). The CPUs 102 are processors that perform arithmetic and logical operations necessary for the operation of the computing system 100.

The computing system 100 may include a multitude of CPUs 102, and each CPU 102 might include multiple processing cores. The CPUs 102 can also be connected to one another using an appropriate inter-processor link such as, but not limited to the INTEL KEIZER TECHNOLOGY INTERCONNECT ("INTEL KTI") from INTEL CORPORATION. Four CPUs 102 are illustrated in the configuration shown in FIG. 1. However, it should be appreciated that other numbers of CPUs 102 (e.g. two, four, eight, etc.) can be utilized in other configurations of the computing system 100. The CPUs 102 are typically installed in sockets on a motherboard implementing the computing system 100. Each of the sockets includes a corresponding CPU 102.

The computing system 100 can also include a firmware (not shown in FIG. 1) for allocating bus numbers to bridge devices in the various embodiments disclosed herein. For example, and without limitation, some computing systems utilize firmware that is compliant with a specification released by the Unified Extensible Firmware Interface ("UEFI") Forum (the "UEFI Specification"). Such a firmware might be referred to herein as a UEFI Specification-compliant firmware, a UEFI-compliant firmware, a UEFI firmware or a firmware. Other types of firmware implementations perform similar functions.

In the configuration shown in FIG. 1, the CPUs 102 are also connected to PCI buses 104A-104D, respectively (which might be referred to herein as a bus 104 or the buses 104). As will be described in greater detail below, the PCI buses 104 might each support one or more PCI devices. In the example shown in FIG. 1, for instance, the PCI device 110A is connected to the PCI bus 104C and the PCI device 110B is connected to the PCI bus 104D via a slot 112.

The PCI devices 110 may comprise cards configured for use with a PCI bus 104, such as a video card, a sound card, a network card, or a suitably configured card for providing another type of functionality. The PCI devices 110 can be connected directly to a bus 104 (e.g. the device 110A), or can be located in a slot 112 that is connected to the bus 104 (e.g. the device 110B). In this regard, it is to be appreciated that while the embodiments disclosed herein are primarily presented in the context of the PCI Bus Standard, the disclosed technologies can be utilized with other bus standards that require allocation of memory address resources to bus devices.

As shown in FIG. 1, the computing system 100 can also include a platform controller hub ("PCH") 108 in some configurations. The PCH 108 controls certain data paths and support functions used in conjunction with CPUs from INTEL CORPORATION. These can include clocking (e.g. the system clock), Flexible Display Interface ("FDI") and Direct Media Interface ("DMI"). In this way, some I/O functions can be shared between the PCH and the CPUs.

Each of the CPUs 102 also includes an interface to memory 106A-106D, respectively (which might be referred to herein collectively as "memory 106"). The memory 106 can be random access memory ("RAM"), for example, that is used as the main memory of the computing system 100.

The memory 106 can be utilized to store program code, such as an operating system for the computing system 100, application programs, driver programs, and other types of programs. The RAM 106 can also be utilized to store various types of data. It is to be appreciated that the architecture of the computing system 100 shown in FIG. 1 has been simplified for discussion purposes. The computing system 100 can include other components, some of which are described below with regard to FIGS. 2-9.

As discussed briefly above, in order to initialize devices present on a bus, it is typically necessary to allocate various types of resources to the devices. For instance, and as described in greater detail below, bus numbers are to be allocated to the bridge devices on a PCI bus. The PCI Bus Architecture Standard also defines three types of memory address resources that are to be allocated to bus devices upon initialization: the PCI I/O address space; the PCI memory address space; and the configuration memory address space.

Figure 2A:
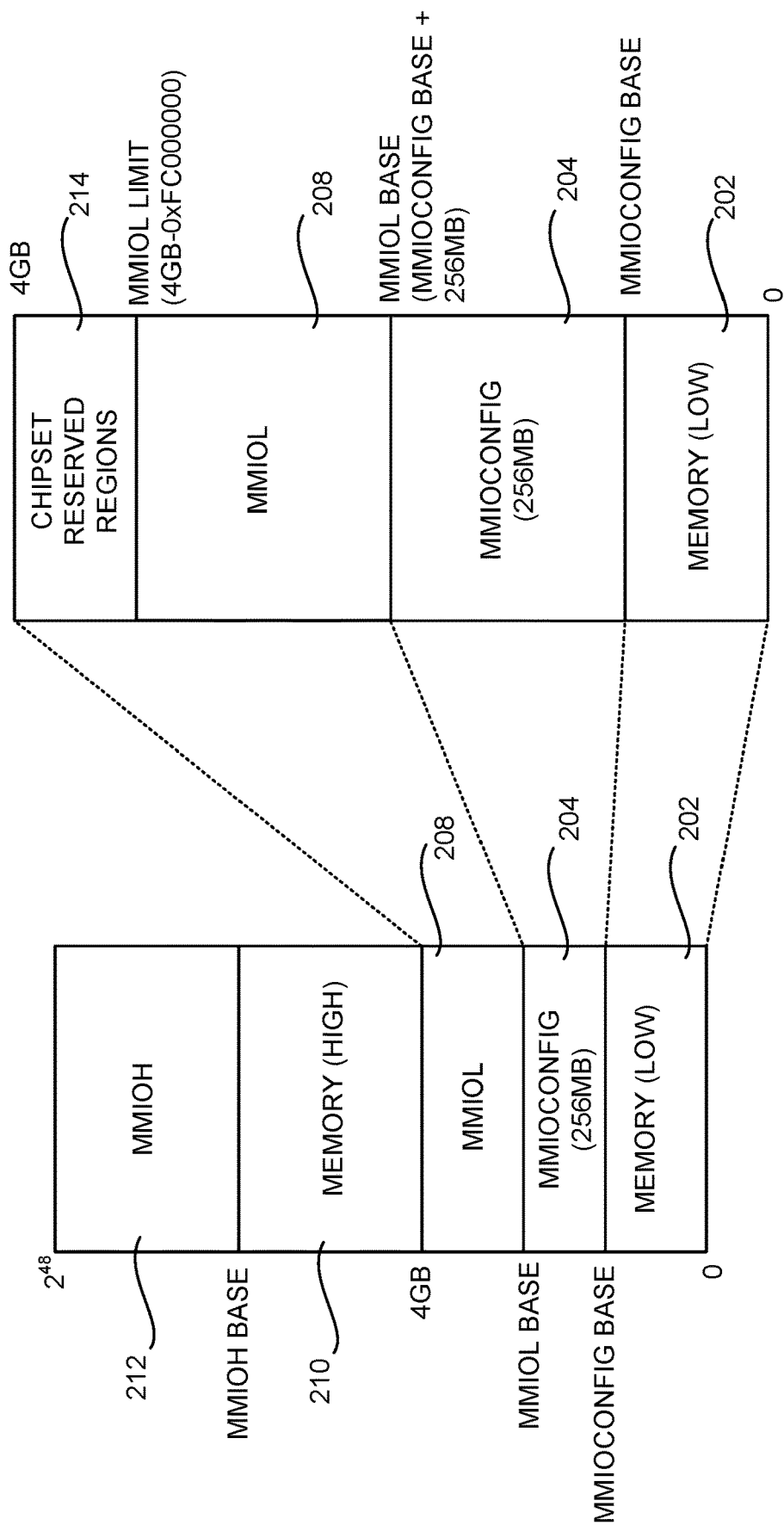
FIG. 2A is a memory map showing aspects of the PCI memory address space and the PCI configuration address space in a computing system configured to implement the functionality disclosed herein, according to one embodiment.

FIG. 2A is a memory map showing aspects of the PCI memory address space, the PCI configuration address space, and the PCI I/O address space in a computing system 100 configured to implement the functionality disclosed herein, according to one embodiment. As shown in FIG. 2A, the PCI configuration address space 204 begins at the top of low memory 202 and extends for 256 MB ("MMIOCONFIG") to the base of a low portion of the PCI memory address space ("MMIOL BASE") 208. The low portion of the PCI memory address space ("MMIOL") 208 extends to 4 GB.

Figure 2B:
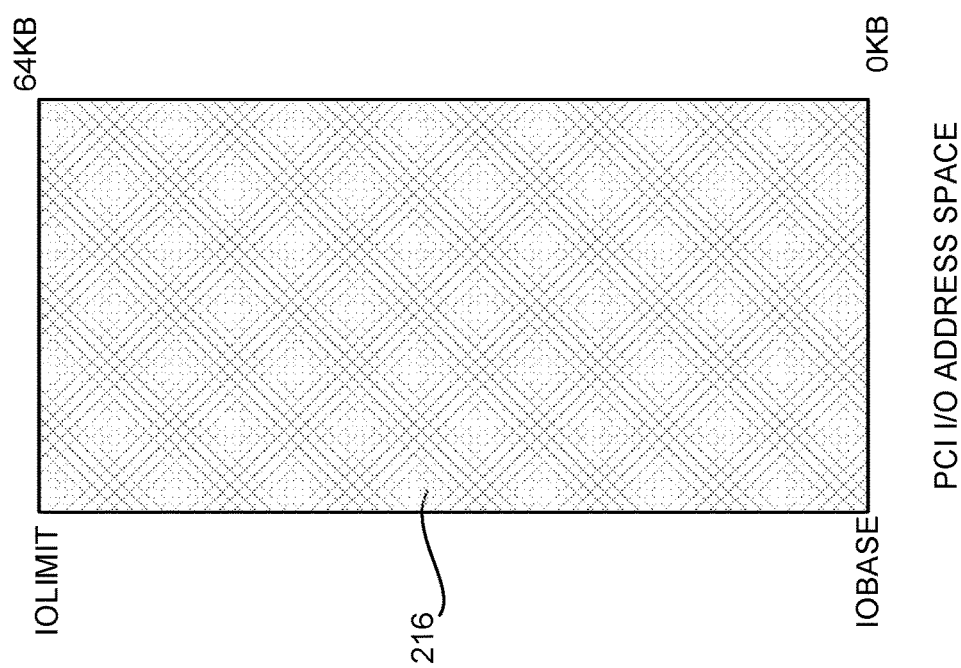
FIG. 2B is a memory map showing aspects of the PCI I/O address space in a computing system configured to implement the functionality disclosed herein, according to one embodiment.

As shown in FIG. 2A, memory addresses can include regions that have been reserved by a chipset. MMIOL, therefore, extends from MMIOL BASE to the base of the chipset reserved regions 214. High memory 210 extends from 4 GB to the base of a high portion of the PCI memory address space ("MMIOH") 212. MMIOH extends from a base address ("MMIOH BASE") to the top of memory (e.g. $2^{48}$ bytes). As shown in FIG. 2B, PCI I/O address space 216 extends from 0 KB ("IOBASE") to 64 KB ("IOLIMIT").

Figure 3:
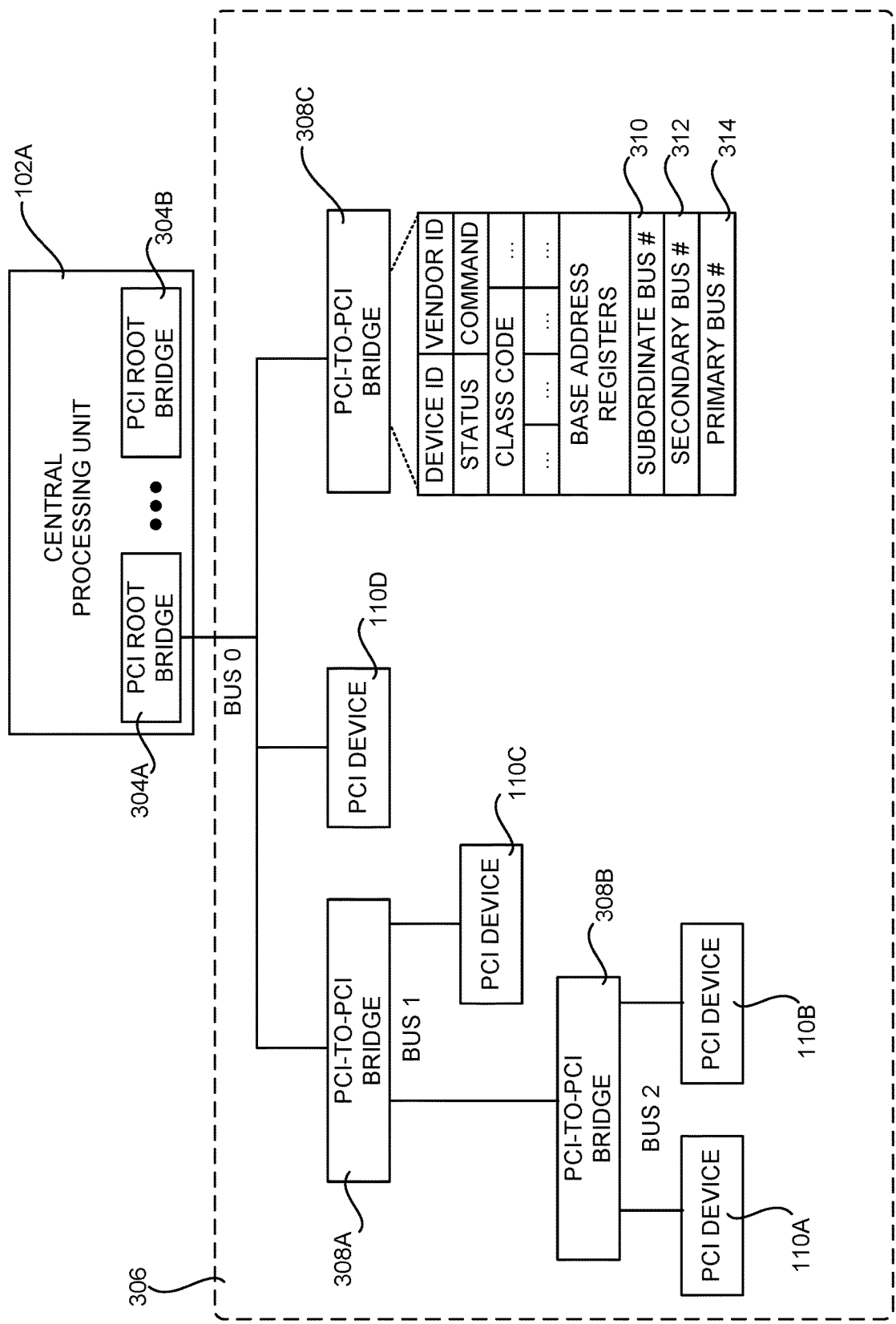
FIG. 3 is a bus diagram showing aspects of an illustrative bus configuration for a computing system that can implement aspects of the technologies disclosed herein, according to one embodiment.

FIG. 3 is a bus diagram showing aspects of an illustrative bus configuration for a computing system 100 that can implement aspects of the technologies disclosed herein, according to one embodiment. This example shows a portion of a typical PCI bus configuration illustrative of the PCI architecture. The PCI bus configuration shown in FIG. 3 includes a host bus (not shown in FIG. 3), to which a host CPU 102A is connected. In general, for a given computing system, a host CPU 102A will be the primary bus master for the computing system, and will be used to service interrupts and handle system errors.

As illustrated in FIG. 3, the various buses in a computing system 100 comprise a hierarchy that includes one or more levels, wherein buses at a lower level are subordinate to buses at a higher level. The first subordinate bus level below the host bus is the root bus, which is labeled "Bus 0" in the illustrative PCI bus configuration shown in FIG. 3.

Buses between levels in the hierarchy are enabled to communicate with one another using bridge devices. The primary purpose of a bridge device is to interface one bus protocol to another. For example, a PCI root bridge 304 is used to enable communication between the host bus and PCI bus 0. Multiple PCI root bridges 304, such as the PCI root bridges 304A and 304B, can be associated with each CPU 102. When a bridge device interfaces similar bus types, the bridge device primarily limits the loading on each bus. From an architectural standpoint, each PCI bridge 308 is considered an additional PCI device for which memory address resources must also be allocated. Bus numbers must also be allocated to the bridge devices 308.

Instances of these types of bridges are illustrated by the various PCI-to-PCI bridges 308 in FIG. 3. In particular, PCI-to-PCI bridge 308A provides an interface between Bus 0 and Bus 1 and PCI-to-PCI bridge 308B provides an interface between Bus 1 and Bus 2. The PCI-to-PCI bridge 308C provides an interface between Bus 0 and another bus not shown in FIG. 3. The buses shown in FIG. 3 might be referred to herein collectively as "the buses" or individually as "a bus." Buses at a lower level in a hierarchy may be referred to being subordinate to buses at a higher level in the hierarchy. It should be appreciated that the embodiments disclosed herein may be utilized with more or fewer buses 104 than shown in FIG. 3.

As also shown in FIG. 3, the buses may each support one or more devices. For instance, Bus 2 includes devices 110A and 110B, while Bus 1 includes the device 110C. Bus 0 includes device 110D. The devices 110 may be connected directly to a bus or might comprise cards configured for use with a PCI bus, such as a video card, a network card, or a suitably configured card for providing another type of functionality. It should be appreciated that more or fewer devices 110 may be utilized than illustrated in FIG. 3.

As discussed briefly above, firmware identifies buses during bus enumeration by a depth-first recursive traversal of the tree structure. Identified buses are then assigned bus numbers sequentially as they are encountered, beginning with zero. Additionally, each of the bridge devices 308 has registers in its configuration space that are defined by the PCI Specification. Three of those registers define a primary bus number 314, a secondary bus number 312, and a subordinate bus number 310 for each bridge 308.

The primary bus number 314 identifies the bus on the upstream port of a bridge device 308. The secondary bus number identifies the bus on the downstream port of a bridge device 308. The subordinate bus number 310 identifies the highest-numbered bus downstream of a bridge device 308.

It should be appreciated that the illustrative bus configuration shown in FIG. 3 and described above has been simplified and that additional hardware components not shown in FIG. 3 may be utilized to implement the bus architecture. It should also be appreciated that while the embodiments presented herein have been disclosed in the context of a PCI bus system, the embodiments presented herein may be utilized with other types of bus architectures and implementations.

As discussed briefly above, the number of available bus numbers is commonly restricted. The total number of available buses (e.g. 256 in a single segment) are also commonly pre-allocated equally to the root bridges 304 in a computing system. If the number of actual buses coupled to a root bridge 304 exceeds the number of buses pre-allocated to that root bridge 304, then it will not be possible to assign resources to some of the bridge devices 308 coupled to the root bridge 304. This would occur, for instance, in a configuration where 16 bus numbers are pre-allocated to a root bridge, but the root bridge is coupled to more than 16 buses. As a result, a bus OOR condition will occur, the bridge devices 308 to which bus numbers could not be allocated will be unavailable, and the computing system might exhibit non-deterministic behavior. The technologies disclosed herein address these and potentially other technical problems.

FIGS. 4A-4J are bus diagrams illustrating aspects of one mechanism disclosed herein for determining the number of buses required by a root bridge 304, according to one embodiment. In the example configuration shown in FIGS. 4A-4J, a computing system has a single CPU coupled to four root bridges 304A-304D. Only the bridges 308 and devices 110 connected to the root bridge 304A are illustrated in FIGS. 4A-4J for ease of discussion.

In FIGS. 4A-4J, the primary, secondary, and subordinate bus numbers for each bridge device 308 are indicated in parenthesis (e.g. (primary, secondary, subordinate)). Bus numbers preceded with an 'F' (e.g. F(0,1,16)) have been set during a forward pass of the depth-first traversal of the bus hierarchy. Bus numbers preceded with a 'B' (e.g. F(0,1,16)) have been set during a backward pass of the depth-first traversal of the bus hierarchy. R(X) is also used in FIGS. 4A-4J to indicate the number of buses required by a bridge device 308 (e.g. R(1) indicates that a bridge device 308 requires one bus; R(X) indicates that the required number of bridge devices have not been determined).

In the example shown in FIGS. 4A-4J, 64 bus numbers are originally allocated equally to root bridges 304A-304D (i.e. each root bridge 304A-308D is originally assigned 16 bus numbers). The root bridge 304A, however, requires 20 bus numbers in this example. The bridges 308 and devices 110 connected to the root bridge 304A will, therefore, cause an OOR condition when enumerated because only 16 bus numbers have been allocated to the root bridge 304A.

In order to remedy the OOR condition caused by the configuration shown in FIGS. 4A-4J, a firmware determines the number of required buses for each root bridge 304, including those root bridges 304 that caused an OOR condition during enumeration of the buses of the root bridges 304 (e.g. the root bridge 304A in FIGS. 4A-4J). The firmware can then reallocate the number of available buses between the root bridges 304 such that each root bridge 304 is allocated a number of the available buses greater than or equal to the number of required buses. In the example shown in FIGS. 4A-4J, for instance, the root bridge 304A would be allocated its original allocation of 16 bus numbers plus 4 additional bus numbers from the allocations of bus numbers to the root bridges 304B-304D.

In some implementations, the number of required buses for a root bridge 304 causing an OOR condition is determined by first enumerating the bridge devices 308 coupled a root bridge 304 causing an OOR condition. When a bridge device 308 is found, the firmware performs a depth-first traversal of the buses under the current bridge device 308. During the forward pass of the depth-first traversal, the firmware programs the primary, secondary, and subordinate bus numbers for the current bridge device 308. Because the subordinate bus number is not known during the forward pass, the firmware programs the subordinate bus number as the total number of buses that have been allocated to the root bridge 304 (i.e. 16 in this example), In the example shown in FIG. 4A, for instance, the first bridge 308 discovered is the bridge 308A. The firmware then programs the primary, secondary, and subordinate bus numbers for the current bridge device 308A (i.e. F(0,1,16)). Next, the firmware discovers the bridge 308B and programs the primary, secondary, and subordinate bus numbers for that bridge device 308B (i.e. (F(1,2,16). The firmware next discovers the bridge 308C and programs the bus numbers for that bridge device 308C (i.e. F(2,3,16)).

Because the bridge device 308C is the last device in the branch of the bus hierarchy, the depth-first traversal begins its backward pass. During the backward pass, the firmware first programs the bus numbers for the bridge device 308C to specify the actual subordinate bus number (i.e. B(2,3,3) since three buses total (Bus 1, Bus 2, and Bus 3) have so far been discovered beneath the bridge 308A). The firmware also stores data indicating that the bridge 308C requires one bus number (i.e. for Bus 3). The backward pass of this portion of the bus hierarchy has now been completed and, consequently, the firmware clears the bus numbers for the bridge device 308C. As will be described in greater detail below, the same bus numbers can be utilized to enumerate the bridge devices 308 in the remainder of the bus hierarchy.

Figure 4A:
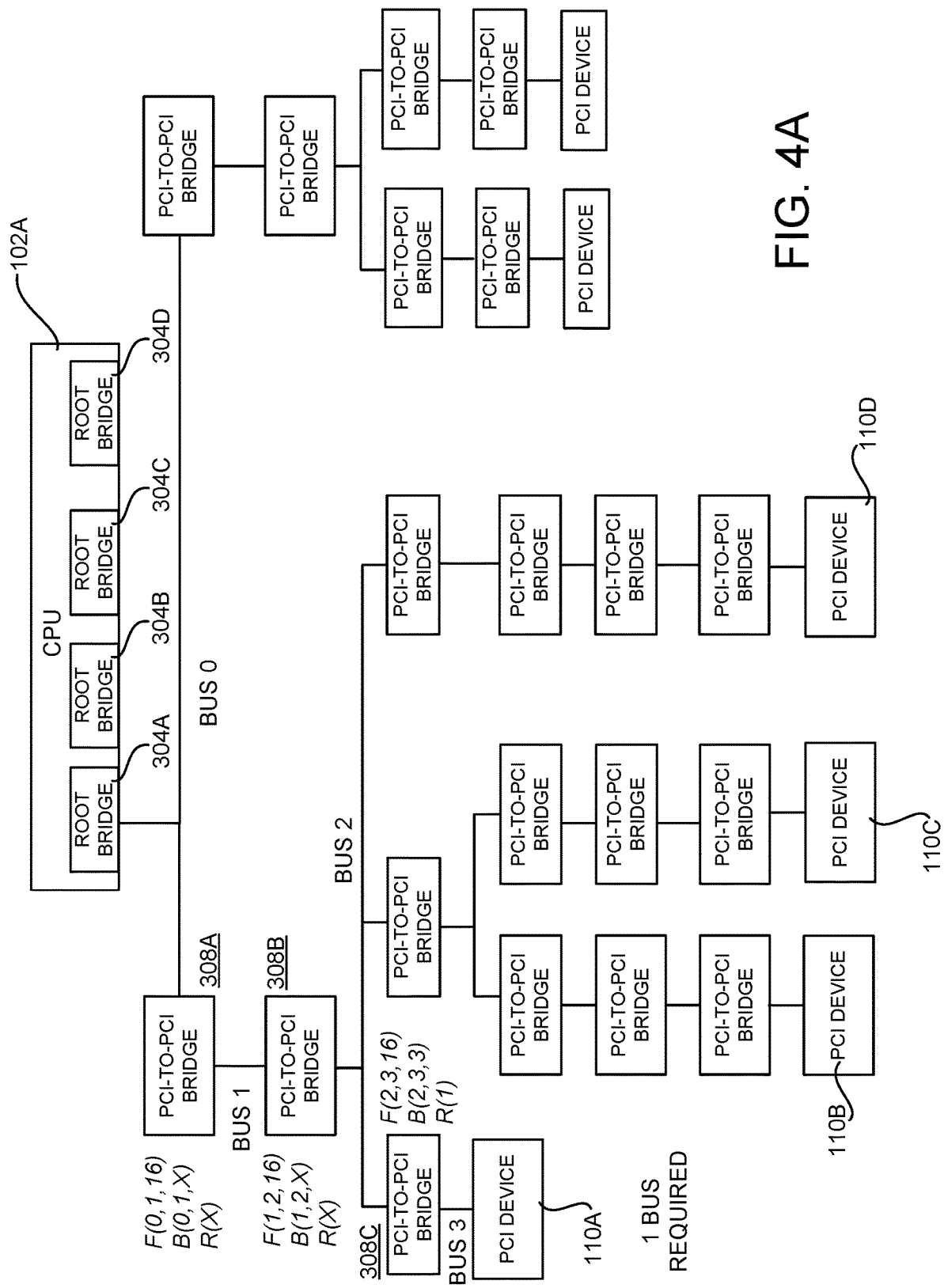
FIGS. 4A-4J are bus diagrams illustrating aspects of one mechanism disclosed herein for determining the number of buses required by a root bridge, according to one embodiment.
Figure 4B:
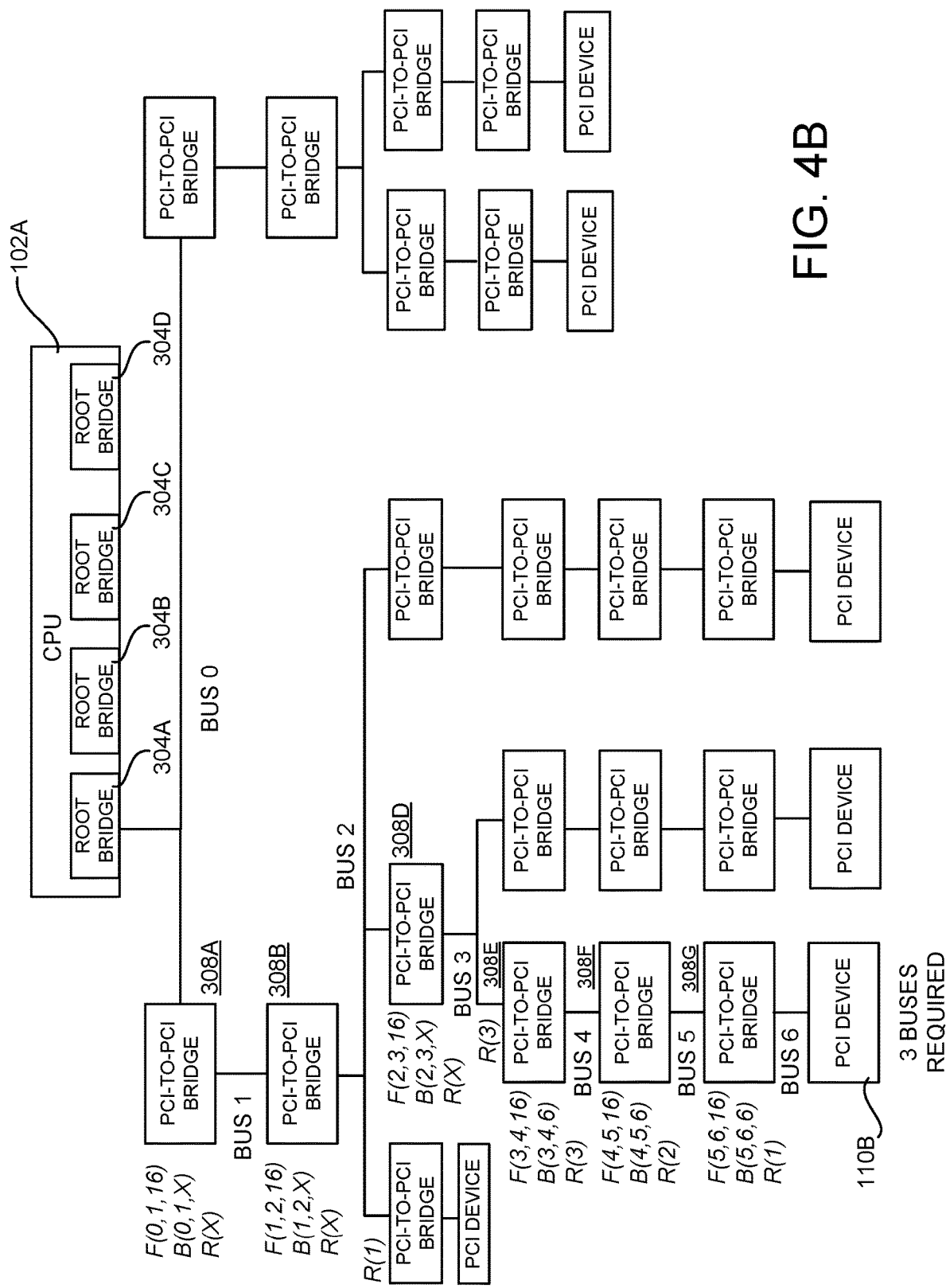

As shown in FIG. 4B, the firmware then discovers the bridge 308D and programs that bridge 308D during the forward pass using the same set of bus numbers that were previously used to program the bridge device 308C (i.e. F(2,3,16)). Continuing the forward pass of the depth-first traversal, the firmware discovers the bridge devices 308E-308G in order and programs their bus numbers (i.e. F(3,4, 16), F(4,5,16), and F(5,6,16), respectively).

Following discovery of the final bridge 308G in this branch of the hierarchy, the backward pass of the depth-first traversal begins. During the backward pass, the firmware first programs the bus numbers for the bridge device 308G to specify the actual subordinate bus number (i.e. B(5,6,6) since six buses total (Buses 1-6) have so far been discovered beneath the bridge 308A). The firmware then continues the backward pass by programming the actual subordinate bus numbers for the bridge devices 308F and 308E (i.e. B(4,5,6) and B(3,4,6), respectively). The firmware also stores data indicating that the bridge 308E requires three bus number (i.e. Buses 4-6). The backward pass of this portion of the bus hierarchy has now been completed and, consequently, the firmware clears the bus numbers for the bridge devices 308E-308G.

Figure 4C:
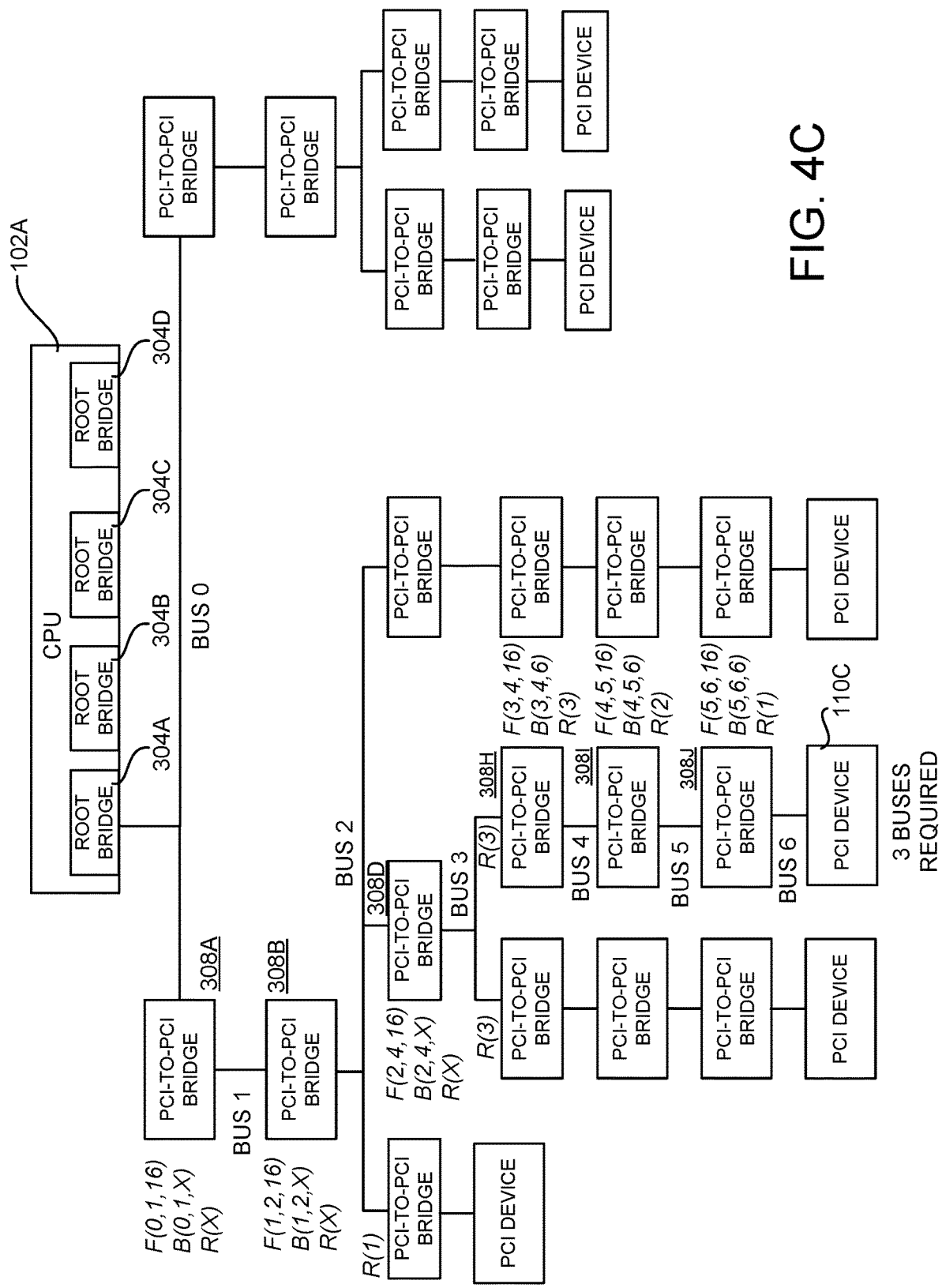
Figure 4D:
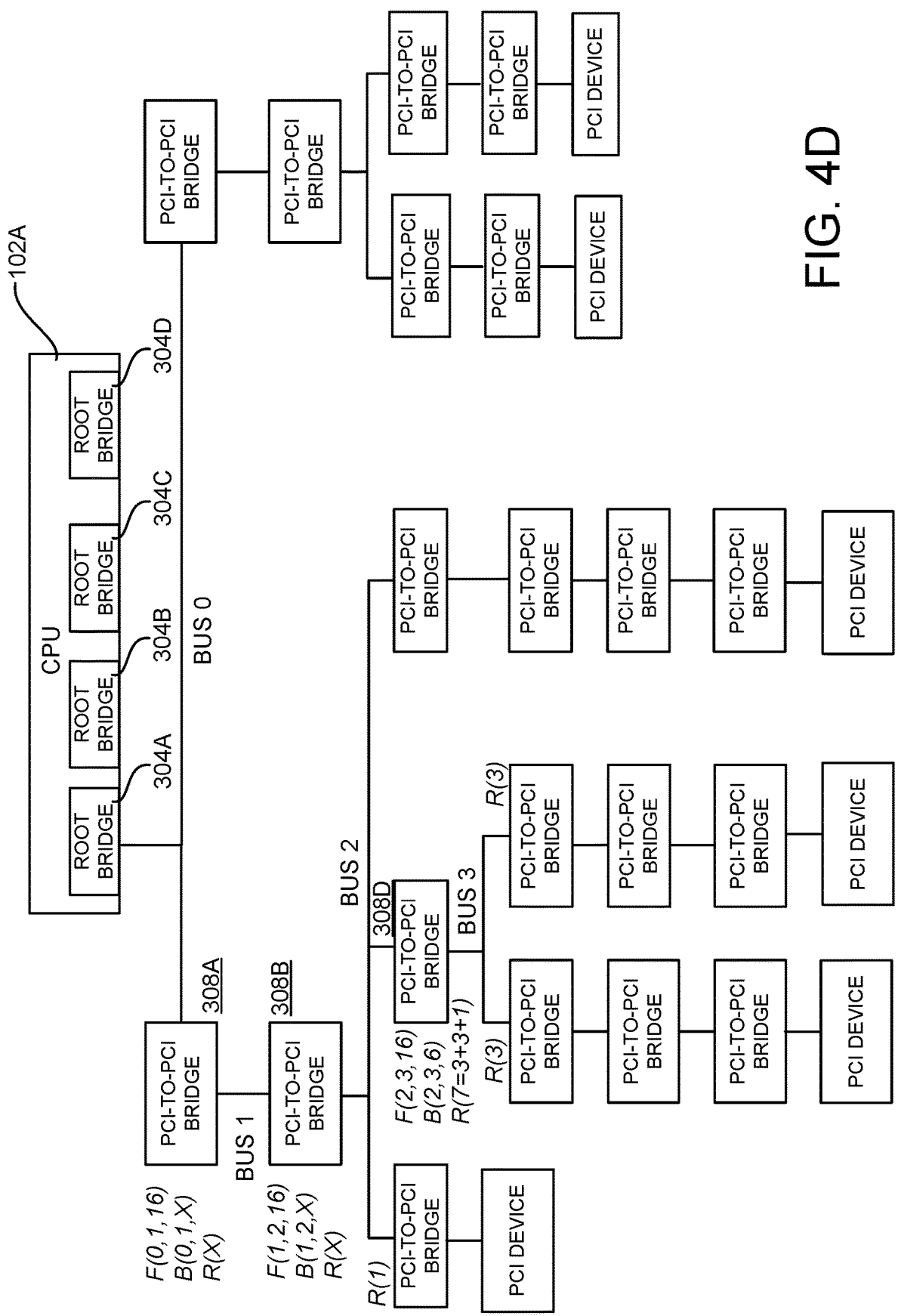

As shown in FIG. 4C, the firmware then discovers the bridge 308H and programs that bridge 308H during the forward pass using the same set of bus numbers that were previously used to program the bridge device 308E (i.e. F(3,4,16)). Continuing the forward pass of the depth-first traversal, the firmware discovers the bridge devices 308I and 308J in order and programs their bus numbers using the same bus numbers previously used for the bridge devices 308F and 308G (i.e. F(4,5,16) and F(5,6,16), respectively).

Following discovery of the final bridge 308J in this branch of the hierarchy, the backward pass of the depth-first traversal begins. During the backward pass, the firmware first programs the bus numbers for the bridge device 308J to specify the actual subordinate bus number (i.e. B(5,6,6) since six buses total (Buses 1-6) have so far been discovered beneath the bridge 308A) during this portion of the traversal. The firmware then continues the backward pass by programming the actual subordinate bus numbers for the bridge devices 308I and 308H (i.e. B(4,5,6) and B(3,4,6), respectively). The firmware also stores data indicating that the bridge 308H requires three bus number (i.e. Buses 4-6). The backward pass of this portion of the bus hierarchy has now been completed and, consequently, the firmware clears the bus numbers for the bridge devices 308H-308J.

Because all of the bridge devices under the bridge 308D have been discovered at this point, the firmware can then program the actual subordinate bus number for this bridge device 308D (i.e. 6 in this example). The firmware also stores data (i.e. R(7)) indicating that the bridge 308D requires seven bus number (i.e. three bus numbers for bridges 308E-308G, three bus numbers for bridges 308H-308J, and one bus number for Bus 3). The depth-first traversal of the bus hierarchy then continues to discover additional bridge devices 308 under the bridge 308B.

Figure 4E:
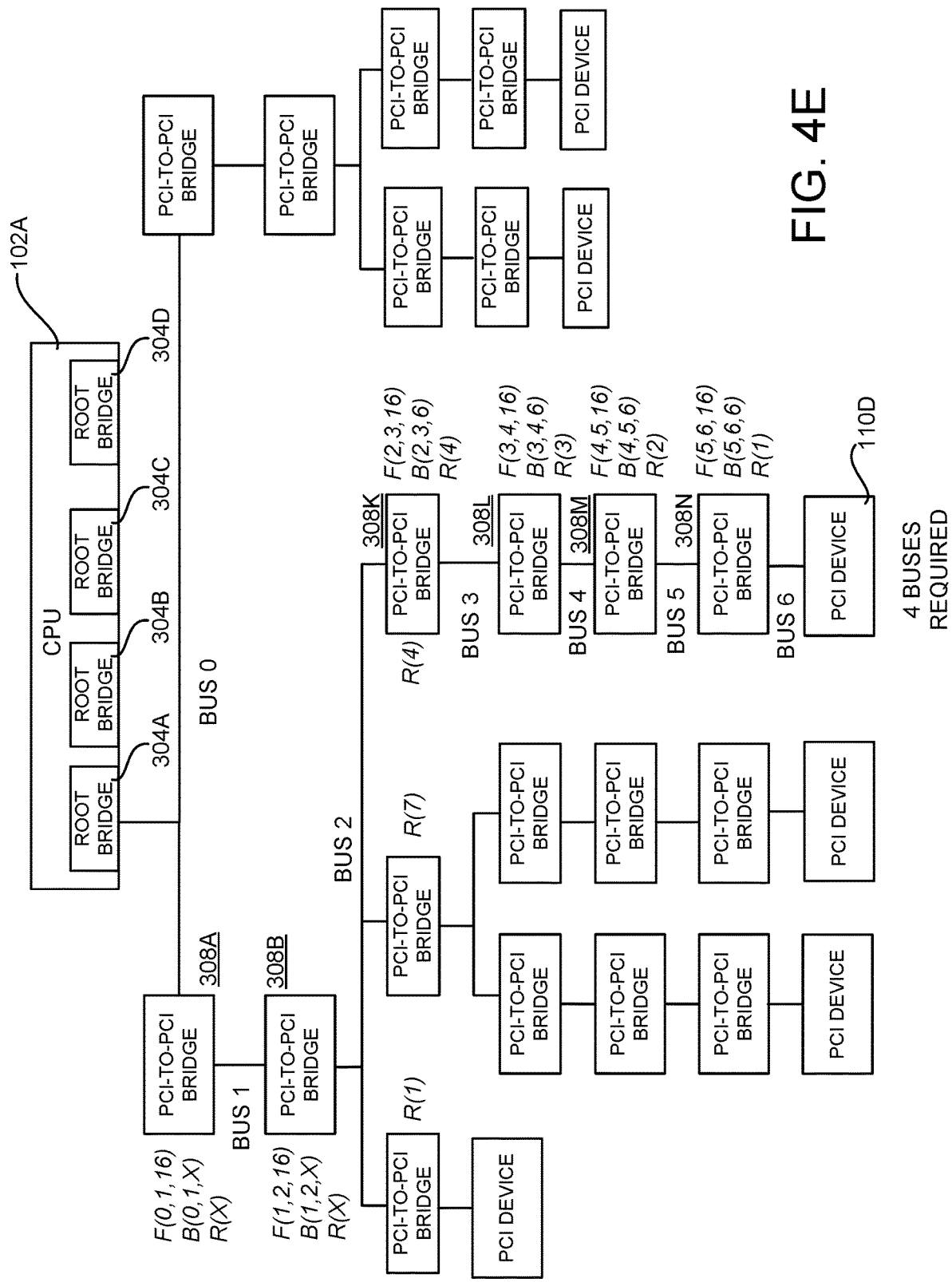

As shown in FIG. 4E, the firmware then discovers the bridge 308K and programs that bridge 308K during the forward pass using the same set of bus numbers that were previously used to program the bridge device 308D (i.e. F(2,3,16)). Continuing the forward pass of the depth-first traversal, the firmware discovers the bridge devices 308L-308N in order and programs their bus numbers (i.e. F(3,4, 16), F(4,5,16), and F(5,6,16), respectively). The bus numbers used to program the bridges 308L-308N are the same numbers previously utilized for the bridges 308H-308J.

Following discovery of the final bridge 308N in this branch of the hierarchy, the backward pass of the depth-first traversal begins. During the backward pass, the firmware first programs the bus numbers for the bridge device 308N to specify the actual subordinate bus number (i.e. B(5,6,6) since six buses total (Buses 1-6) have so far been discovered beneath the bridge 308A) during this portion of the traversal. The firmware then continues the backward pass by programming the actual subordinate bus numbers for the bridge devices 308M, 308L, and 308K (i.e. B(4,5,6) B(3,4,6), and B(2,3,6), respectively). The firmware also stores data indicating that the bridge 308K requires four bus number (i.e. Buses 3-6). The backward pass of this portion of the bus hierarchy has now been completed and, consequently, the firmware clears the bus numbers for the bridge devices 308K-308N.

Because all of the bridges 308 under the bridge 308B have been discovered, the firmware then programs the actual subordinate bus number for that bridge 308B (i.e. B(1,2,6)). The firmware also stores data (i.e. R(12)) indicating that the bridge 308B requires twelve bus number (i.e. one bus number for bridge 308C, three bus numbers for bridges 308E-308G, three bus numbers for bridges 308H-308J, four bus numbers for bridges 308K-308N, and one bus number for Bus 2).

Figure 4F:
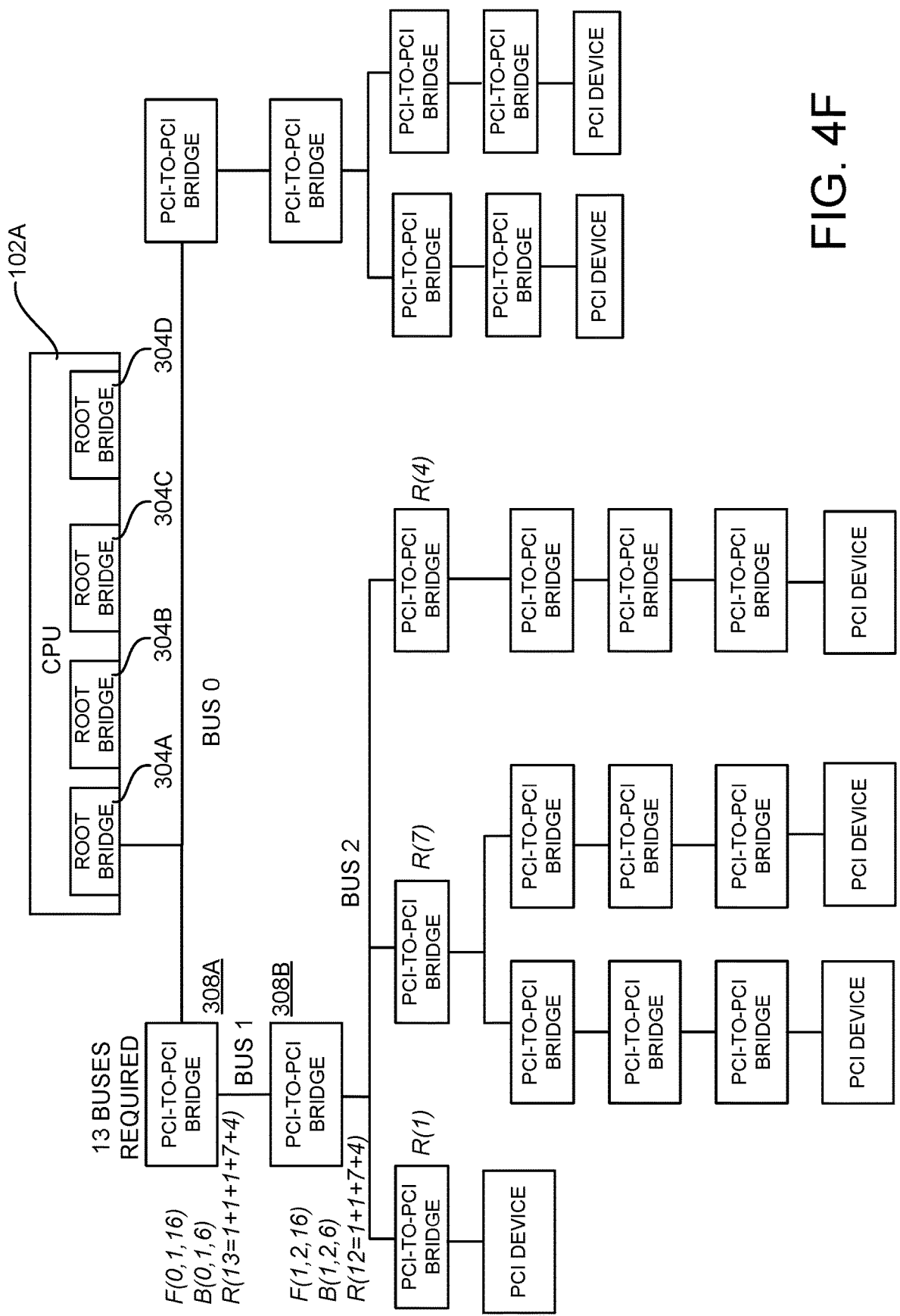

Because all of the bridges 308 under the bridge 308A have now been discovered, the firmware then programs the actual subordinate bus number for that bridge 308A (i.e. B(0,1,6)). The firmware also stores data (i.e. R(13)) indicating that the bridge 308A requires thirteen bus number (i.e. one bus number for bridge 308C, three bus numbers for bridges 308E-308G, three bus numbers for bridges 308H-308J, four bus numbers for bridges 308K-308N, and one bus number for bridge 308B, and one bus number for Bus 1). This is illustrated in FIG. 4F. The firmware then clears the bus numbers for the bridges 308A and 308B.

Figure 4G:
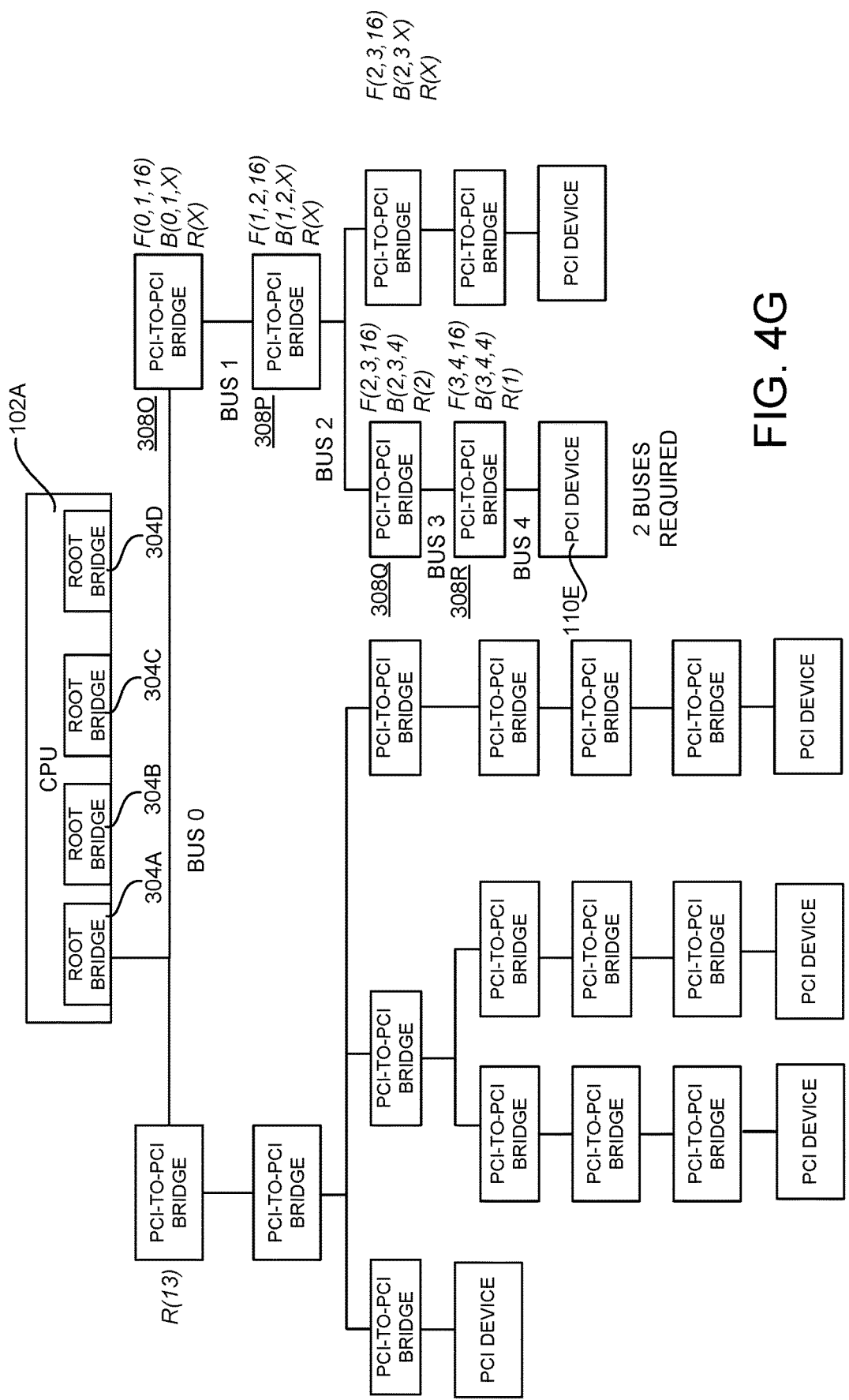

As shown in FIG. 4G, the next bridge 308 to be discovered under the root bridge 304A is the bridge 308O. The firmware programs the primary, secondary, and subordinate bus numbers for the that bridge device 308O (i.e. F(0,1,16)) using the bus numbers previously used to program the bridge 308A. Next, the firmware discovers the bridge 308P and programs the primary, secondary, and subordinate bus numbers for that bridge device 308P using the bus numbers previously used to program the bridge 308B (i.e. (F(1,2,16). The firmware next discovers the bridge 308Q and programs the bus numbers for that bridge device 308Q (i.e. F(2,3,16)) and discovers the bridge 308R and programs the bus numbers for that bridge device 308C (i.e. F(3,4,16)).

Following discovery of the final bridge 308R in this branch of the hierarchy, the backward pass of the depth-first traversal begins. During the backward pass, the firmware first programs the bus numbers for the bridge device 308R to specify the actual subordinate bus number (i.e. B(3,4,4) since four buses total (Buses 1-4) have so far been discovered beneath the bridge 308O) during this portion of the traversal. The firmware then continues the backward pass by programming the actual subordinate bus numbers for the bridge device 308Q (i.e. B(2,3,4)). The firmware also stores data indicating that the bridge 308Q requires two bus number (i.e. Buses 3 and 4). The backward pass of this portion of the bus hierarchy has now been completed and, consequently, the firmware clears the bus numbers for the bridge devices 308Q and 308R.

Figure 4H:
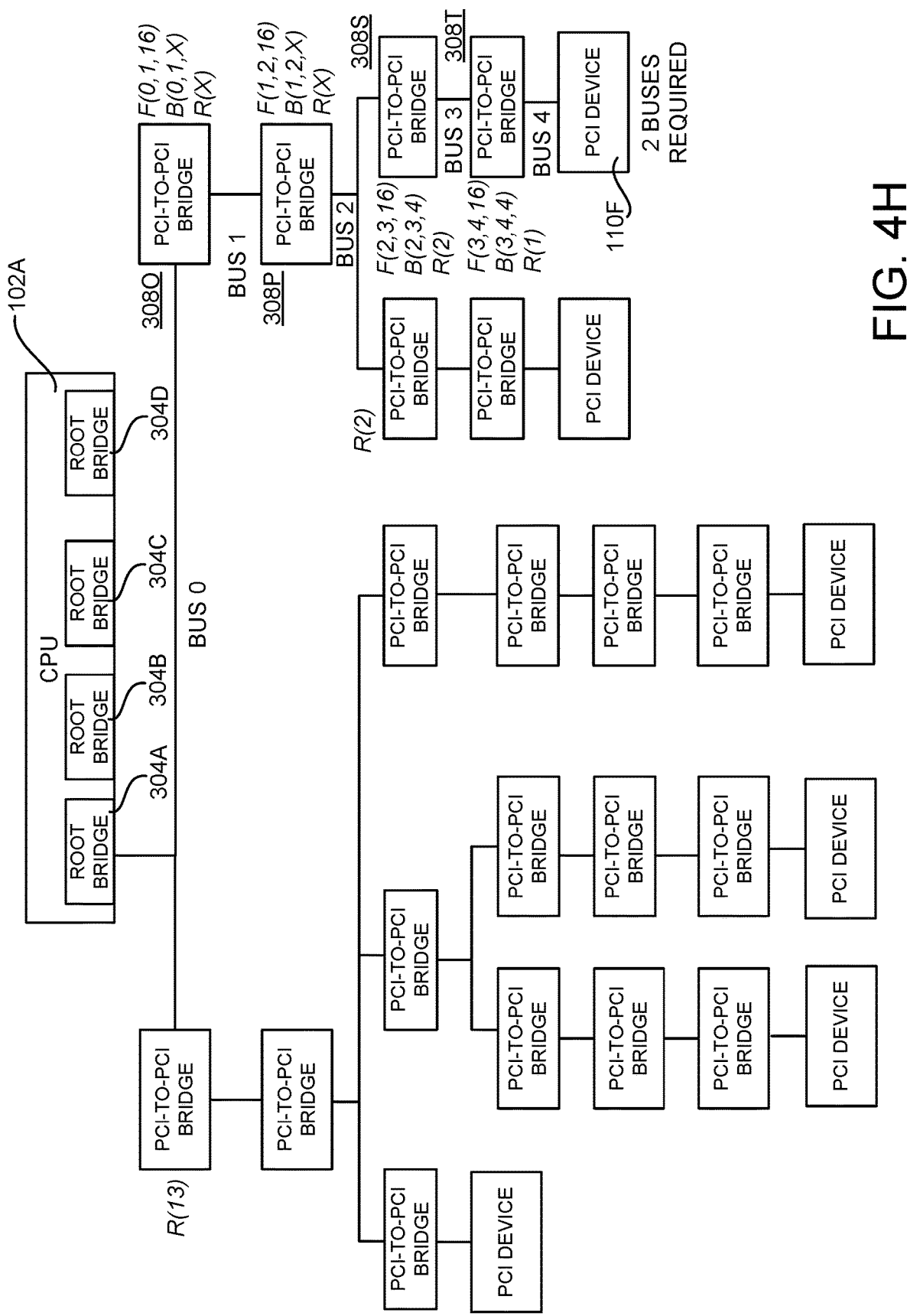

As shown in FIG. 4H, the next bridge 308 to be discovered under the bridge 308P is the bridge 308S. The firmware programs the primary, secondary, and subordinate bus numbers for the that bridge device 308S (i.e. F(2,3,16)) using the bus numbers previously used to program other bridges. Next, the firmware discovers the bridge 308T and programs the primary, secondary, and subordinate bus numbers for that bridge device 308P using bus numbers previously used to program other bridge devices 308.

Following discovery of the final bridge 308T in this branch of the hierarchy, the backward pass of the depth-first traversal begins. During the backward pass, the firmware first programs the bus numbers for the bridge device 308T to specify the actual subordinate bus number (i.e. B(3,4,4) since four buses total (Buses 1-4) have so far been discovered beneath the bridge 308O) during this portion of the traversal. The firmware then continues the backward pass by programming the actual subordinate bus numbers for the bridge device 308S (i.e. B(2,3,4)). The firmware also stores data indicating that the bridge 308Q requires two bus number (i.e. Buses 3 and 4). The backward pass of this portion of the bus hierarchy has now been completed and, consequently, the firmware clears the bus numbers for the bridge devices 308S and 308T.

Figure 4I:
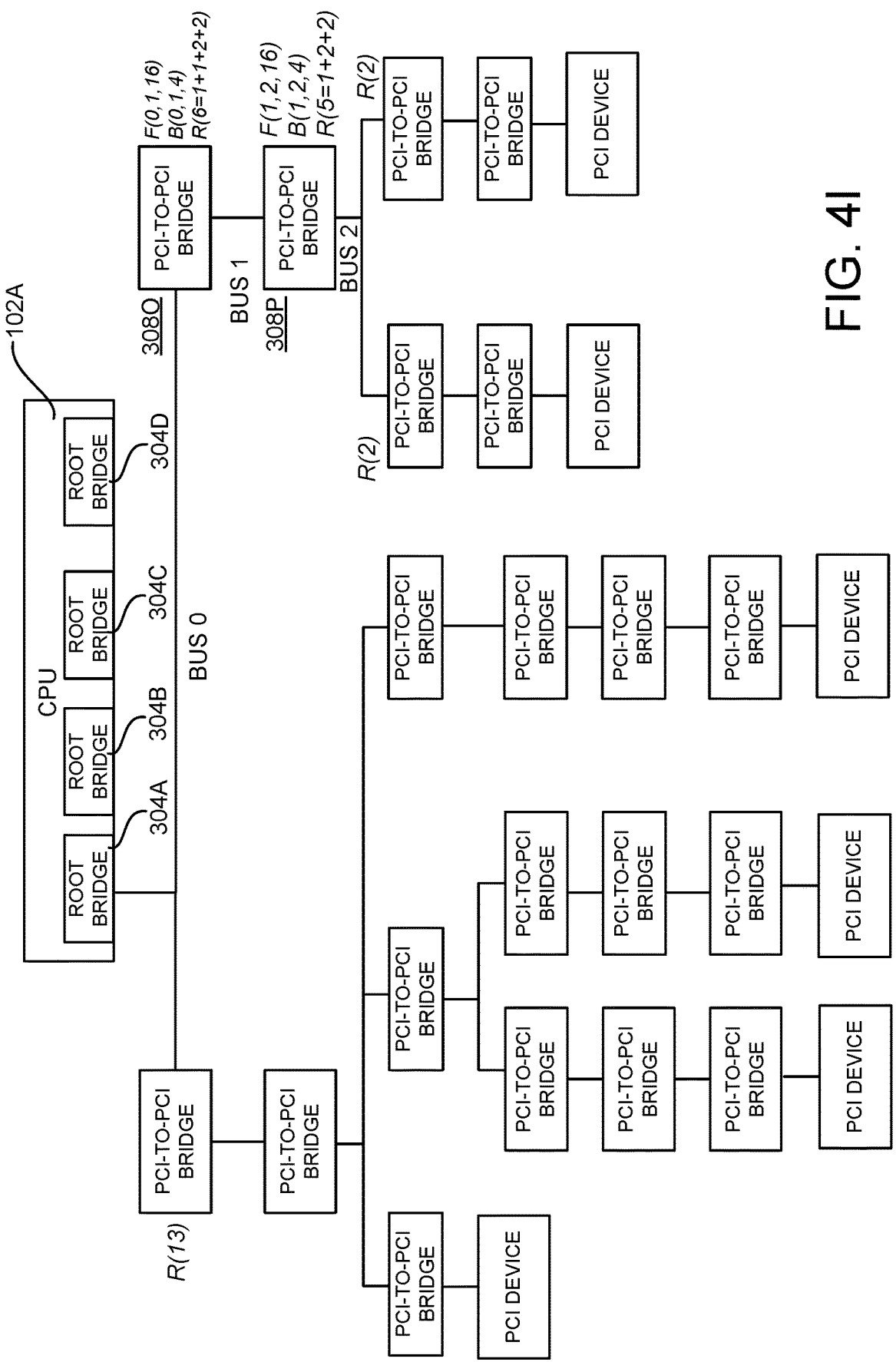
Figure 4J:
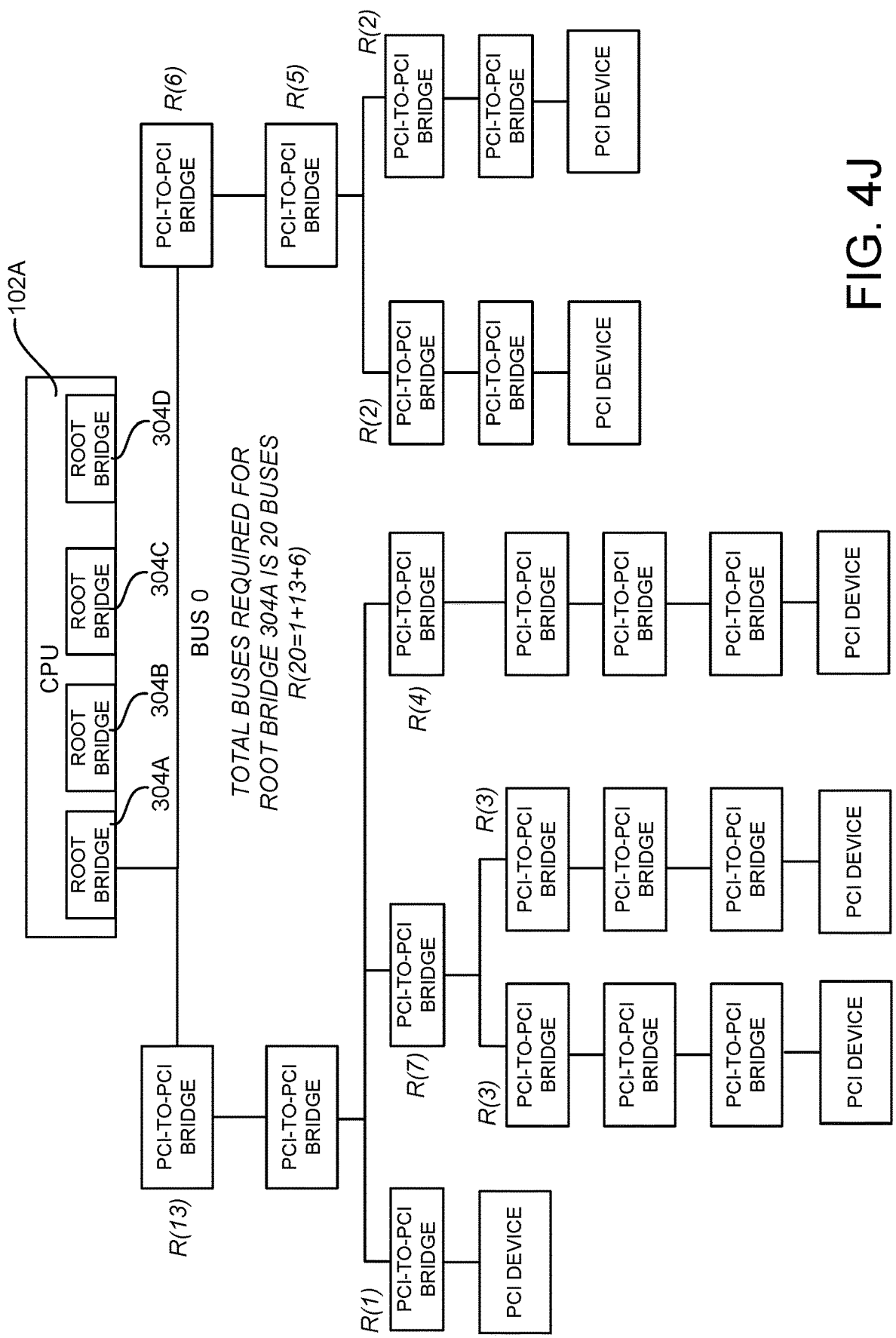

Because all of the bridges 308 under the bridge 308P have now been discovered, the firmware then programs the actual subordinate bus number for that bridge 308P (i.e. B(1,2,4)). The firmware also stores data (i.e. R(5)) indicating that the bridge 308P requires five bus number (i.e. two bus numbers for bridges 308Q and 308R, two bus numbers for bridges 308S and 308T, and one bus number for Bus 2). This is illustrated in FIG. 4I.

Because all of the bridges 308 under the bridge 308O have also now been discovered, the firmware then programs the actual subordinate bus number for that bridge 308O (i.e. B(0,1,4)). The firmware also stores data (i.e. R(6)) indicating that the bridge 308O requires six bus number (i.e. two bus numbers for bridges 308Q and 308R, two bus numbers for bridges 308S and 308T, one bus number for bridge 308P, and one bus number for Bus 1). This is also illustrated in FIG. 4I. The firmware then clears the bus numbers for the bridges 308O and 308P.

Because all of the bridge devices 308 under the root bridge 304A have now been discovered, the firmware then sums the requirements for all of the bridge devices 308A-308T under the root bridge 304A to determine that the total number of buses required is 20 (i.e. thirteen bus numbers for the bridge 308A, six bus numbers for the bridge 308O, and one bus number for Bus 0). Data identifying the total number of buses required by all of the bridge devices 308 under the root bridge 304 causing the OOR condition can then be stored (e.g. 20 in the example shown in FIGS. 4A-4J). This process can be repeated for each root bridge 304 causing an OOR condition. The number of buses required by root bridges 304 not causing an OOR condition can be determined by enumerating the buses on those root bridges 304 in the ordinary manner.

Once the firmware has determined the number of buses required by each root bridge 304, including those causing an OOR condition, the firmware can reallocate the number of available bus numbers between the root bridges 304A-304D such that each root bridge 304 is allocated a number of the available buses greater than or equal to the number of required buses. In the example shown in FIGS. 4A-4J, for instance, the root bridge 304A would be allocated its original allocation of 16 bus numbers plus 4 additional bus numbers (a total of 20 bus numbers) from the allocations of bus numbers to the root bridges 304B-304D.

The firmware can store data identifying the new allocation in a non-volatile memory and restart the computing device following reallocating of the number of available buses between the plurality of root bridges 304. Upon rebooting, the computing system will utilize the new allocation of bus numbers to allocate the bus numbers to the root bridges 304, thereby eliminating the OOR condition.

In some embodiments, a computing device implementing the technologies disclosed herein includes a single processor 102 having multiple root bridges 304 coupled thereto. In this embodiment, a single one of the root bridges 304 coupled to the processor 102 generates an OOR condition during the enumeration of the buses. The embodiments disclosed herein can reallocate the available buses in the manner described above to eliminate the OOR condition in this scenario.

In other embodiments, a computing device implementing the technologies disclosed herein includes a single processor 102 having multiple root bridges 304 coupled thereto. In this embodiment, two or more of the root bridges 304 coupled to the processor 102 generate an OOR condition during the enumeration of the buses. The embodiments disclosed herein can also reallocate the available buses to eliminate the OOR condition in this scenario.

In other embodiments, a computing device implementing the technologies disclosed herein includes multiple processors 102, each of which has multiple root bridges 304 coupled thereto. In this embodiment, one or more of the root bridges 304 coupled to each processor 102 generates an OOR condition during the enumeration of the buses. The embodiments disclosed herein can also reallocate the available buses to eliminate the OOR condition in this scenario.

In other embodiments, a computing device implementing the technologies disclosed herein includes a processor 102 coupled to root bridges 304 on a first segment and a second processor 103 coupled to root bridges 304 on a second segment. A single PCI segment includes 256 PCI buses. In this embodiment, at least one of the root bridges 304 on one of the segments of one of the processors 102 generates an OOR condition during enumeration of the buses. The embodiments disclosed herein can also reallocate the available buses to eliminate the OOR condition in this scenario.

In some scenarios it is not possible to reallocate bus numbers to root bridges 304 to satisfy all of their requirements. For example, in the scenario described above it will not be possible to reallocate bus numbers to prevent an OOR condition when the root bridges 304A-304B require more than 256 buses. In the event that bus numbers cannot be reallocated to prevent an OOR condition, several additional operations might be performed. For example, a PCI multi-segment feature might be enabled on the computing system if it is not already enabled. Alternately, the firmware might disable certain bus devices such that the OOR condition can be remedied. The firmware might also let a user configure which devices are to be enabled in the event of an unresolvable OOR condition (e.g. a display). Other operations might also be performed in the event of an unresolvable OOR condition.

Figure 5A:
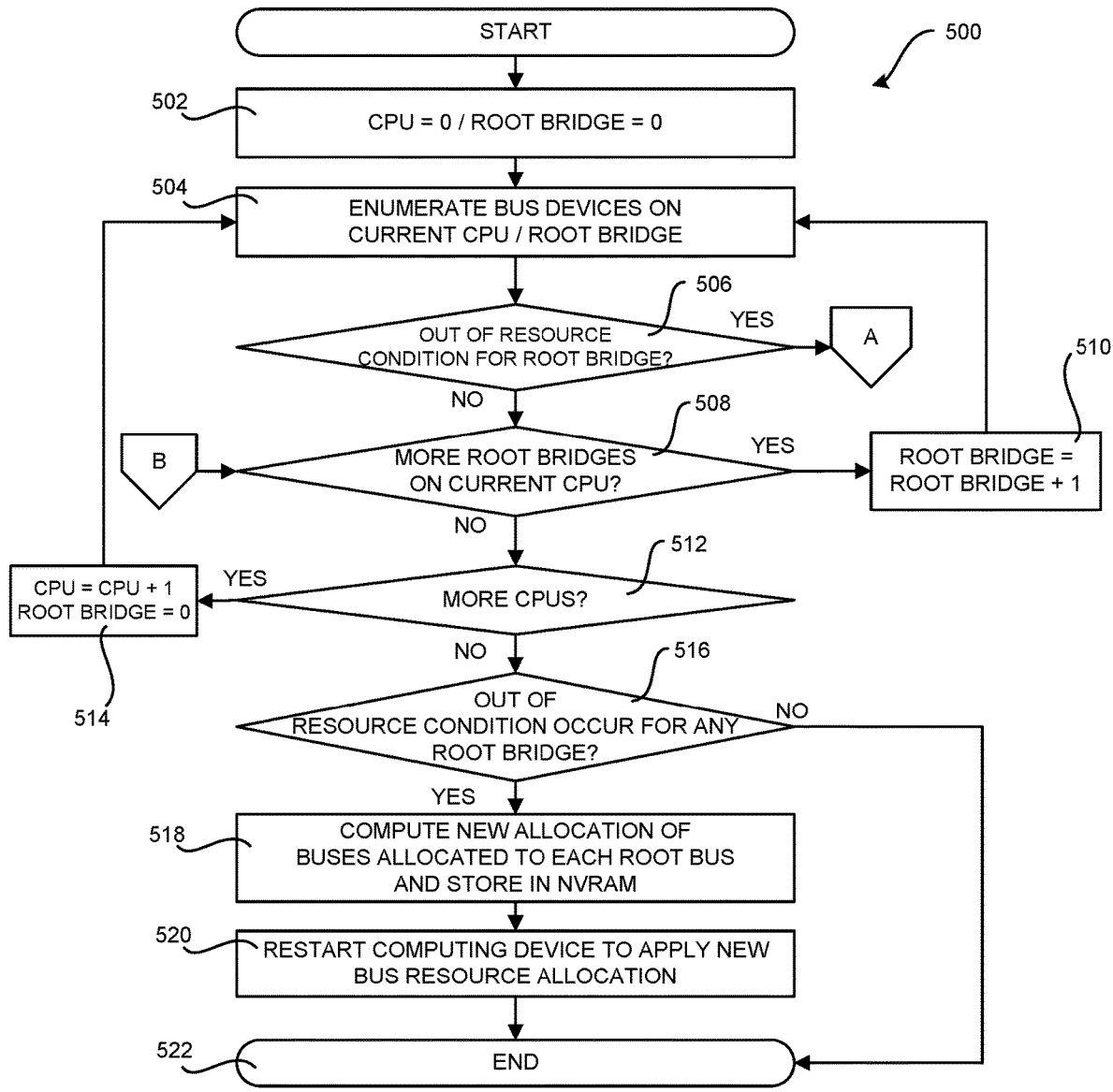
FIGS. 5A and 5B are flow diagrams illustrating aspects of a routine disclosed herein for automatic bus resource adjustment in multiple root bridge computing systems, according to one embodiment.
Figure 5B:
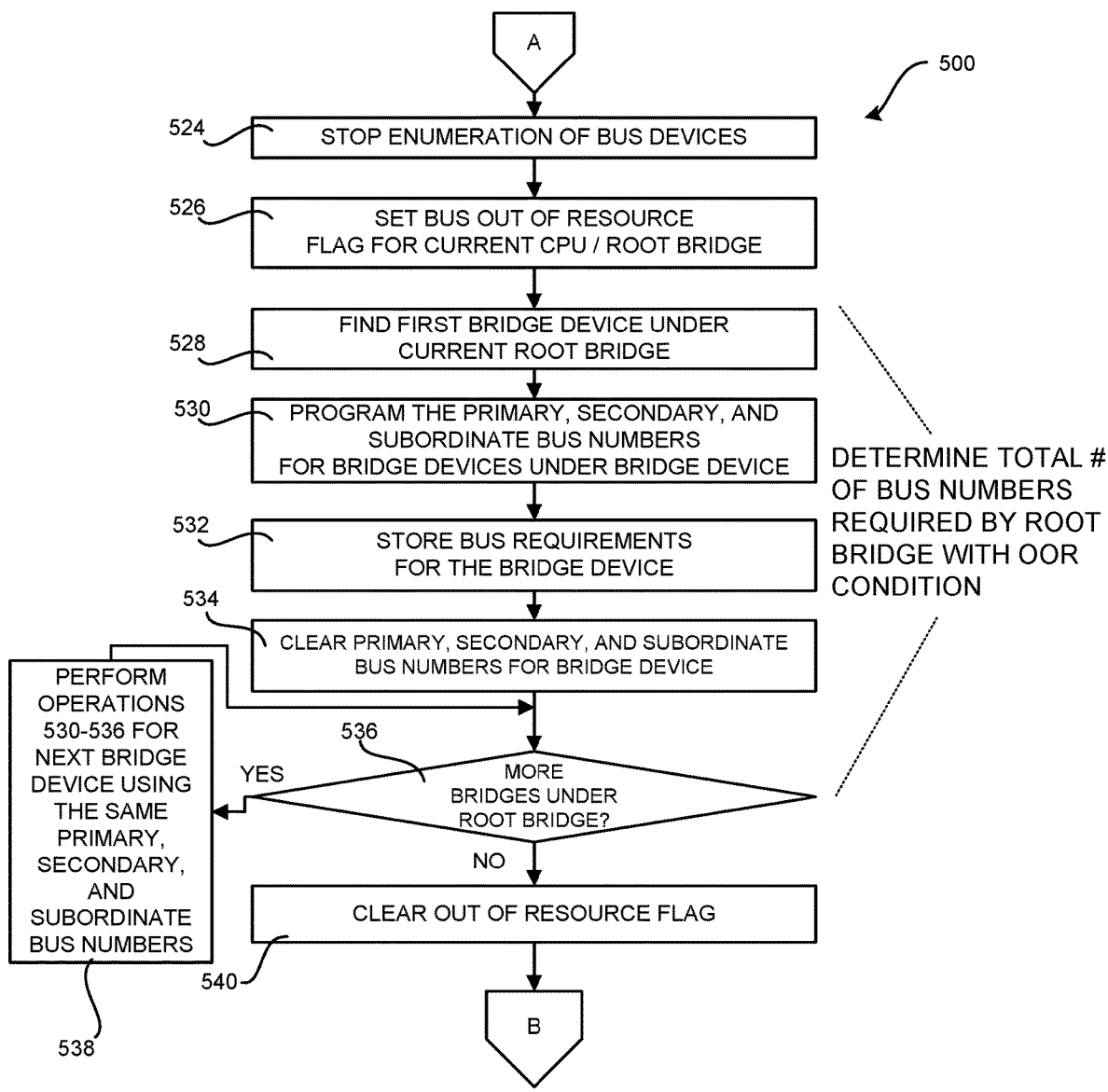

FIGS. 5A and 5B are flow diagrams illustrating aspects of a routine 500 disclosed herein for automatic bus resource adjustment in multiple root bridge computing systems, according to one embodiment. It should be appreciated that the logical operations described herein with regard to FIGS.

5A and 5B, and the other FIGS., are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Accordingly, the logical operations described herein are referred to variously as operations, structural devices, acts, or modules. These operations, structural devices, acts and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 500 begins at operation 502, where the computer system 100 begins its boot process and begins enumerating the bus devices 110 present in the computing system 100. In particular, the firmware initializes variables to keep track of the current processor 102 and root bridge 304 being enumerated. These variables are initialized to zero.

From operation 502, the routine 500 proceeds to operation 504, where the firmware attempts to allocate bus numbers to the bridge devices 308 on the current processor and root bridge 304. As discussed above, the number of bus numbers allocated to the current processor 102 and root bridge 304 can be fixed, such as 16 bus numbers in some implementations. From operation 504, the routine 500 proceeds to operation 506.

At operation 506, the processor 102 determines whether an OOR condition was encountered during enumeration of the current root bridge 304. If so, the routine 500 proceed from operation 506 to operation 524, which is shown in FIG. 5B and described below. If an OOR condition was not encountered during enumeration of the current root bridge 304, the routine 500 proceeds from operation 506 to operation 508.

At operation 508, the firmware determines whether there are more root bridges 304 on the current processor 102 to be enumerated. If so, the routine 500 proceeds from operation 508 to operation 510, where the variable identifying the current root bridge 304 is incremented. The routine 500 then proceeds from operation 510 back to operation 504. If no additional root bridges 304 on the current processor 102 remain to be enumerated, the routine 500 proceeds from operation 508 to operation 512.

At operation 512, the firmware determines whether there are additional processors 102 for which bus numbers are to be assigned. If there are more processors 102 to be assigned bus numbers, the routine 500 proceeds from operation 512 to operation 514, where the variable identifying the current processor 102 is incremented. The routine 500 then proceeds from operation 514 back to operation 504. If no additional processors 102 remain to be enumerated, the routine 500 proceeds from operation 512 to operation 516.

At operation 516, the firmware determines whether an OOR condition has occurred for any of the root bridges 304. If not, allocation of bus numbers to the root bridges 304 completed successfully and the computing system can continue the boot process. Accordingly, the routine 500 proceeds to operation 516, where it ends. If, however, the firmware determines that an OOR condition has occurred for at least one root bridge 304, the routine 500 proceeds from operation 516 to operation 518.

At operation 518, the firmware computes a new allocation of bus numbers for each of the root bridges 304. As discussed above, the firmware can reallocate the number of available bus numbers between the root bridges 304 such that each root bridge 304 is allocated a number of the available buses greater than or equal to the number of required buses. The firmware stores data describing the allocation in a non-volatile memory, such as an NVRAM. The firmware then causes the computing system to reboot at operation 520.

When the computing system restarts, the computing system will utilize the new allocation of bus numbers to the root bridges 304 to assign bus numbers thereto. This will allow bus numbers to be assigned to the root bridges 304 without causing an OOR condition. From operation 520, the routine 500 proceeds to operation 522, where it ends.

As discussed above, if an OOR condition is encountered for the current root bridge 304, the routine 500 proceeds from operation 506 to operation 524. At operation 524, the firmware stops the enumeration of bus devices 110 for the current root bridge 304. The routine 500 then proceeds from operation 524 to operation 526, where the firmware sets a flag indicating that enumeration of the current root bridge 304 on the current processor 102 has resulted in an OOR condition. The routine 500 then proceeds from operation 526 to operation 528.

At operation 528, the firmware locates the first bridge device 308 under the current root bridge 304 (i.e. the bridge device 308A in the example shown in FIG. 4A). The routine 500 then proceeds from operation 528 to operation 530, where the firmware programs the primary, secondary, and subordinate bus numbers for the bridge devices 308 under the current bridge device 308 (e.g. the bridges 308B-308C in the example shown in FIG. 4A). The routine 500 then proceeds to operation 532, where the firmware updates a variable that stores data identifying the total number bus numbers required by the current root bridge 304.

From operation 532, the routine 500 proceeds to operation 534, where the firmware clears the primary, secondary, and subordinate bus numbers for all of the bridge devices 308 under the first bridge device 308 connected to the current root bridge 304. By clearing these bus numbers, the same set of bus numbers can be utilized to determine the bus requirements for the next bridge device 308 connected to the current root bridge 304.

From operation 534, the routine 500 proceeds to operation 536, where the firmware determines whether there are more bridge devices 308 under the current root bridge 304 for which bus requirements are to be determined. If so, the routine 500 proceeds from operation 536 to operation 538, where operations 530, 532, and 534 can be performed for the next bridge device 308. If no additional bridge devices 308 remain, the routine 500 proceeds from operation 536 to operation 540, where the OOR flag set at operation 526 is cleared. The routine 500 then proceeds back to operation 508, which was described above with regard to FIG. 5A.

As discussed above, it is not possible to reallocate bus numbers to root bridges 304 to satisfy all of their requirements in some scenarios. In the event that bus numbers cannot be reallocated to prevent an OOR condition, the firmware might perform other operations. For example, the firmware might enable a PCI multi-segment feature on the computing system if it is not already enabled. Alternately, the firmware might disable certain bus devices specified by an original equipment manufacturer ("OEM") of the computing system such that the OOR condition can be remedied. The firmware might also let a user of the computing system configure the devices that are to be enabled in the event of an unresolvable OOR condition (e.g. a display). A firmware setup menu option might be provided to define the devices that are to be enabled. Other operations might also be performed in the event of an unresolvable OOR condition.

FIGS. 6A-6D are data diagrams showing an original allocation of bus numbers, a required allocation of bus numbers, and an allocation of bus numbers that has been adjusted using the technologies disclosed herein in several different illustrative scenarios. The example shown in FIG. 6A illustrates the allocation of bus numbers in the example shown in FIGS. 4A-4J and described above. In particular, and as discussed above, the computing device in this example include a single processor 102 with four root bridges 304. Additionally, and as also described above, 64 bus numbers are originally assigned to each of the root bridges 304 equally (i.e. 16 buses each).

In the example shown in FIGS. 4A-4J, however, root bridge 304A requires 20 bus numbers and, as a result, a single OOR condition has occurred on a single processor 102. Root bridges 304B-304D require 18, 8, and 16 bus numbers respectively (not illustrated in FIGS. 4A-4J). Using the mechanism described above, root bridge 304A can be allocated its required 20 bus numbers. In order to accomplish this, 4 bus numbers are taken from the original allocation of 16 bus numbers to the root bridge 304C since that root bridge 304C only requires 8 bus numbers. In this manner, bus numbers are reallocated to the root bridges 304A-304D such that each root bridge 304 is allocated a number of buses greater than or equal to the number of required buses.

In the example shown in FIG. 6B, the available bus numbers have been allocated in the same manner as with respect to the example shown in FIG. 6A. In this example, however, OOR conditions have occurred with respect to two root bridges. The first root bridge 304 requires 16 buses, the second root bridge 304 requires 22 bus numbers, thereby causing an OOR condition, the third root bridge 304 requires 17 bus numbers, also causing an OOR condition, and the fourth root bridge 304 requires 6 bus numbers.

Using the mechanism described above, bus numbers are reallocated to the four root bridges 304 such that each root bridge 304 is assigned a number of buses greater than or equal to the required number of buses. In particular, the first root bridge 304 is allocated the required 16 bus numbers, the second root bridge 304 is allocated the required 22 bus numbers, the third root bridge 304 is assigned the required 17 bus numbers, and the fourth root bridge 304 is allocated 9 bus numbers. Seven bus numbers are taken from the original allocation of 16 bus numbers to the fourth root bridge 304 to satisfy the allocation requirements of the second and fourth root bridge 304.

In the example shown in FIG. 6C, the computing device includes two processors 102 each of which has four root bridges 304. 16 bus numbers have been originally assigned to each root bridge 304. In this example, OOR conditions have occurred with respect to three root bridges. The second root bridge 304 on the first processor 102 requires 22 buses, thereby causing an OOR condition. The second and third root bridges 102 coupled to the second processor 102 require 19 and 17 buses, respectively, which also cause OOR conditions.

Using the mechanism described above, bus numbers are reallocated to the eight root bridges 304 connected to the two processors 102 such that each root bridge 304 is assigned a number of buses greater than or equal to the required number of buses. In particular, on the first processor 102 the first root bridge 304 is allocated the required 16 bus numbers, the second root bridge 304 is allocated the required 22 bus numbers, the third root bridge 304 is assigned 16 bus numbers, and the fourth root bridge 304 is allocated 10 bus numbers. Six bus numbers are taken from the original allocation of 16 bus numbers to the fourth root bridge 304 on the first processor 102 to satisfy the allocation requirements of the second root bridge 304 on the first processor 102.

With regard to the second processor 102, the mechanism described above is utilized to reallocate the available bus numbers (i.e. 64) to the four root bridges 304 coupled thereto such that each root bridge 304 is assigned a number of buses greater than or equal to the required number of buses. In particular, on the second processor 102 the first root bridge 304 is allocated the required 16 bus numbers, the second root bridge 304 is allocated the required 19 bus numbers, the third root bridge 304 is assigned the required 17 bus numbers, and the fourth root bridge 304 is allocated 12 bus numbers. Four bus numbers are taken from the original allocation of 16 bus numbers to the fourth root bridge 304 on the second processor 102 to satisfy the allocation requirements of the second and third root bridges 304.

In the example shown in FIG. 6D, two processors 102 are each assigned to a PCI segment (i.e. segment zero and segment one). In this example, 256 bus numbers are available per segment and, consequently, each root bridge 304 on each processor is initially assigned 32 bus numbers. In this example, however, several of the root bridges 304 require more than 32 bus numbers (i.e. CPU0/RB1 requires 40 bus numbers, CPU0/RB3 requires 44 bus numbers, CPU1/RB1 requires 36 bus numbers, CPU1/RB3 requires 48 bus numbers, CPU2/RB0 requires 48 bus numbers, CPU2/RB2 requires 36 bus numbers, CPU3/RB0 requires 44 bus numbers, and CPU3/RB2 requires 40 bus numbers). In this example, the mechanism described above can be utilized to reallocate bus numbers from root bridges 304 in each segment that are initially allocated more than their required number of bus numbers to root bridges 304 that require bus numbers in excess of the originally allocated number. In this manner, the required allocation of bus numbers to root bridges 304 in both segments can be satisfied.

Figure 7:
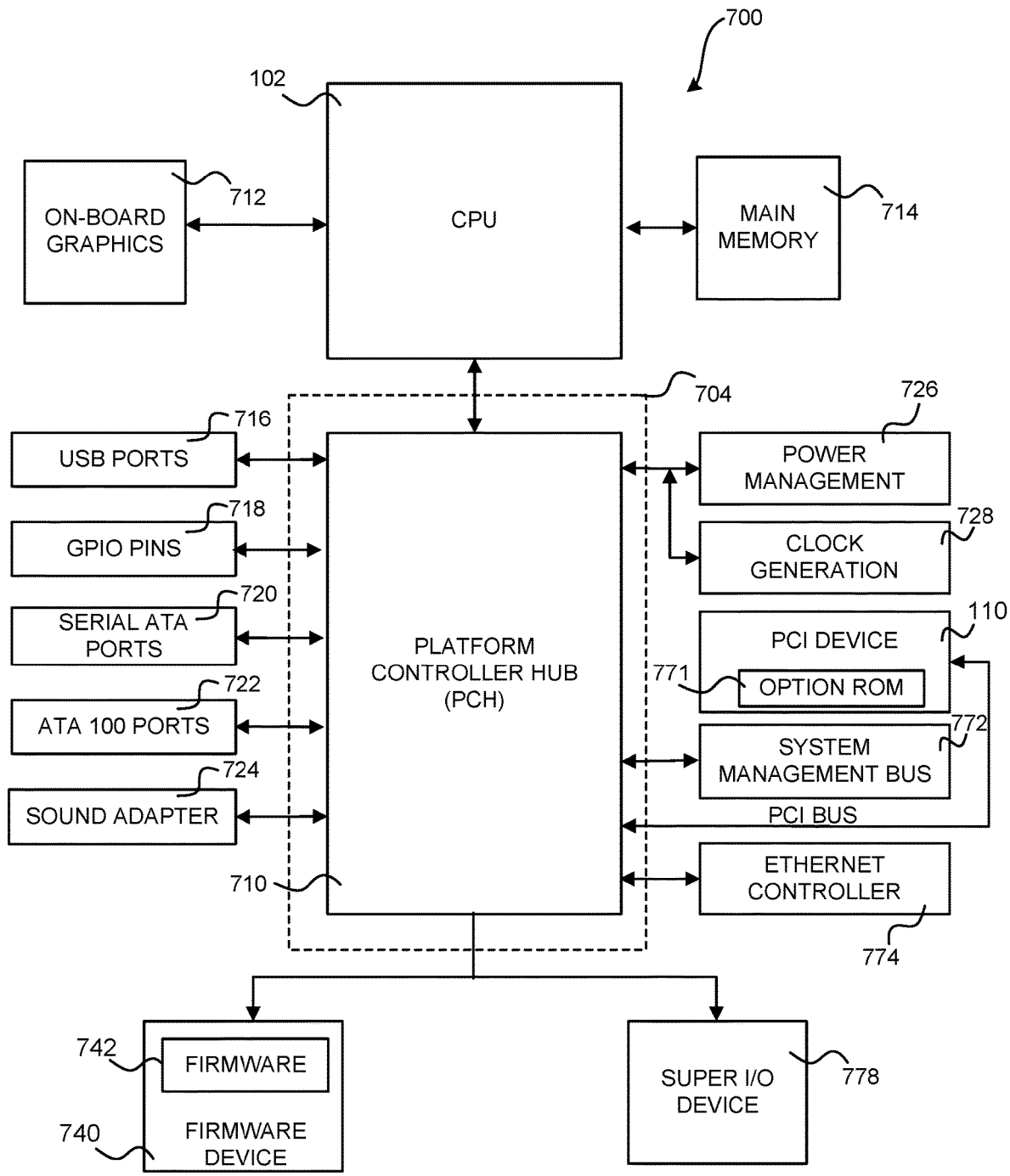
FIG. 7 is a computer architecture diagram that illustrates various components of a computing device that can provide the functionality disclosed herein.

Referring now to FIG. 7, an illustrative computer architecture for a computer 700 capable of implementing the various technologies discussed herein will be described. The computer architecture shown in FIG. 7 can be utilized to implement the technologies disclosed herein for automatic bus resource adjustment in a multiple root bridge computing system. It should be appreciated that although the configurations described herein are discussed primarily in the context of a server computer, the configurations can be utilized with virtually any type of computing device that utilizes bus bridge devices.

In order to provide the functionality described herein, the computer 700 can include a baseboard, or motherboard (not shown in FIG. 7). The motherboard can be a printed circuit board to which some or all of the components shown in FIG. 7 can be connected by way of a system bus or other electrical communication path.

In one illustrative configuration, the motherboard includes multiple CPUs 102 (only one CPU 102 is shown in FIG. 7) configured to operate in conjunction with a chipset 704. The CPUs 102 can be central processors that perform arithmetic and logical operations necessary for the operation of the computer. For example, the CPU 102 might be a CPU available from INTEL CORPORATION, AMD CORPORATION, or a CPU based upon the ARM architecture from ARM HOLDINGS. Other types of CPUs might also be utilized. In some configurations, the CPUs 102 include an interface to a random access memory ("RAM") used as the main memory 714 in the computer 700 and, possibly, to an on-board graphics adapter 712.

In one implementation, particularly where CPUs available from INTEL CORPORATION or AMD CORPORATION are utilized, the chipset 704 includes a platform controller hub ("PCH") 710. In implementations where a CPU 102 based upon the ARM architecture is utilized, a system-on-chip ("SOC") can be utilized, which can include some or all of the various components described below.

The PCH 710 provides an interface between the CPU 102 and the remainder of the computer 700. The PCH 710 can also provide functionality for enabling networking communication through an Ethernet controller 774, or another type of network interface. The Ethernet controller 774 can connect the computer 700 to another computer via a network. Connections that can be made by the Ethernet controller 774 can include local area network ("LAN") or wide area network ("WAN") connections. LAN and WAN networking environments are commonplace in offices, enterprise-wide computer networks, intranets, and the Internet.

The PCH 710 can also include components for controlling many of the input/output functions of the computer 700. In particular, the PCH 710 can provide one or more universal serial bus ("USB") ports 716, a sound adapter 724, the Ethernet controller 774, and one or more general purpose input/output ("GPIO") pins 718. The PCH 710 can also provide a system management bus 772 for use in managing the various components of the computer 700. Power management circuitry 726 and clock generation circuitry 728 can also be utilized during the operation of the PCH 710.

The PCH 710 can also provide a bus for interfacing PCI devices 110, such as a SCSI host bus adapter. As discussed above, the bus comprises a PCI bus in one configuration. It should be appreciated that other types of add-in cards compliant with other types of bus standards might also be utilized. The PCI device 110 might also include an option ROM 771. As known to those skilled in the art, the option ROM 771 of a bus device contains program code executable by the CPU 102, such as a firmware driver that is used to connect the device to the system once the option ROM 771 is loaded.

The PCH 710 can also provide one or more interfaces for connecting mass storage devices to the computer 700. For instance, according to one configuration, the PCH 710 includes a serial advanced technology attachment ("SATA") adapter for providing one or more SATA ports 720 and an ATA100 adapter for providing one or more ATA100 ports 722. The SATA ports 720 and the ATA100 ports 722 can be, in turn, connected to one or more mass storage devices (not shown in FIG. 7) storing an OS and application programs. As known to those skilled in the art, an OS comprises a set of programs that control operations of a computer and allocation of resources. An application program is software that runs on top of the OS and uses computer resources made available through the OS to perform application-specific tasks.

The mass storage devices, and their associated computer-readable storage media, can provide non-volatile storage for the computer 700. In addition to these mass storage devices, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Encoding the program modules can also transform the physical structure of the storage media. The specific transformation of physical structure can depend on various factors in different implementations of the disclosed technologies. Examples of such factors can include, but are not limited to: the technology used to implement the storage media; whether the storage media are characterized as primary or secondary storage; and the like. For example, if the storage media are implemented as semiconductor-based memory, the program modules can transform the physical state of a semiconductor memory when the software or firmware is encoded therein. In one example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of locations within given magnetic media. These transformations can also include altering the physical features or characteristics of locations within given optical media to change the optical characteristics of those locations. It should be appreciated that various other transformations of physical media are possible without departing from the scope and spirit of the present description.

It should be appreciated that the program modules disclosed herein can include software instructions that, when loaded into the CPUs 102 and executed, transform a general-purpose computing system into a special-purpose computing system customized to facilitate all, or part of, the operations disclosed herein. As detailed throughout this description, the program modules can provide various tools or techniques by which the computer 700 can participate within the overall systems or operating environments using the components, logic flows, and/or data structures discussed herein.

As also shown in FIG. 7, a low pin count ("LPC") interface can also be provided by the PCH 710 for connecting a "Super I/O" device 778. The Super I/O device 778 is responsible for providing I/O ports, including, but not limited to, a keyboard port, a mouse port, a serial interface, a parallel port, and other types of I/O ports. The LPC interface can also connect a firmware device 740 such as a ROM, EPROM, or a flash memory such as a non-volatile random access memory ("NVRAM") for storing the firmware 742 that includes program code containing the routines that help to start up the computer 700 and to transfer information between elements within the computer 700. The firmware 742 can also implement aspects of the technologies disclosed herein. As discussed above, in one configuration the firmware 742 is a firmware that is compliant with the UEFI Specification.

The LPC interface can also be utilized to connect a NVRAM to the computer 700. The NVRAM 77 can be utilized by the firmware 742 to store configuration data for the computer 700. The configuration data for the computer 700 can also be stored on the same device 740 as the firmware 742 in some configurations.

The computer 700 can be implemented as an embedded control computer, a laptop, a server computer, a mobile device, a set-top box, a kiosk, a tablet or slate computing device, a vehicular information system, a mobile telephone, a customized machine, or other hardware platform. The CPU 102 can be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

The CPU 102 can be constructed from transistors and/or other circuit elements, which can individually or collectively assume any number of states. More specifically, the CPU 102 can operate as a state machine or finite-state machine. Such a machine can be transformed to a second machine, or a specific machine, by loading executable instructions contained within the program modules (e.g. the modules making up the firmware 742). These computer-executable instructions can transform the CPU 102 by specifying how the CPU 102 transitions between states, thereby transforming the transistors or other circuit elements constituting the CPU 102 from a first machine to a second machine, wherein the second machine can be specifically configured to perform the operations disclosed herein. The states of either machine can also be transformed by receiving input from one or more user input devices, network interfaces, other peripherals, other interfaces, or one or more users or other actors. Either machine can also transform states, or various physical characteristics of various output devices such as printers, speakers, video displays, or otherwise.

It should be appreciated that the various technologies disclosed herein can be implemented within other types of computing devices, including hand-held computers, embedded computer systems, smartphones, tablet or slate computing devices, personal digital assistants, or another type of computing device. It is also contemplated that the computer 700 might not include all the components shown in FIG. 7, can include other components that are not explicitly shown in FIG. 7, or can utilize an architecture completely different than that shown in FIG. 7.

Figure 8:
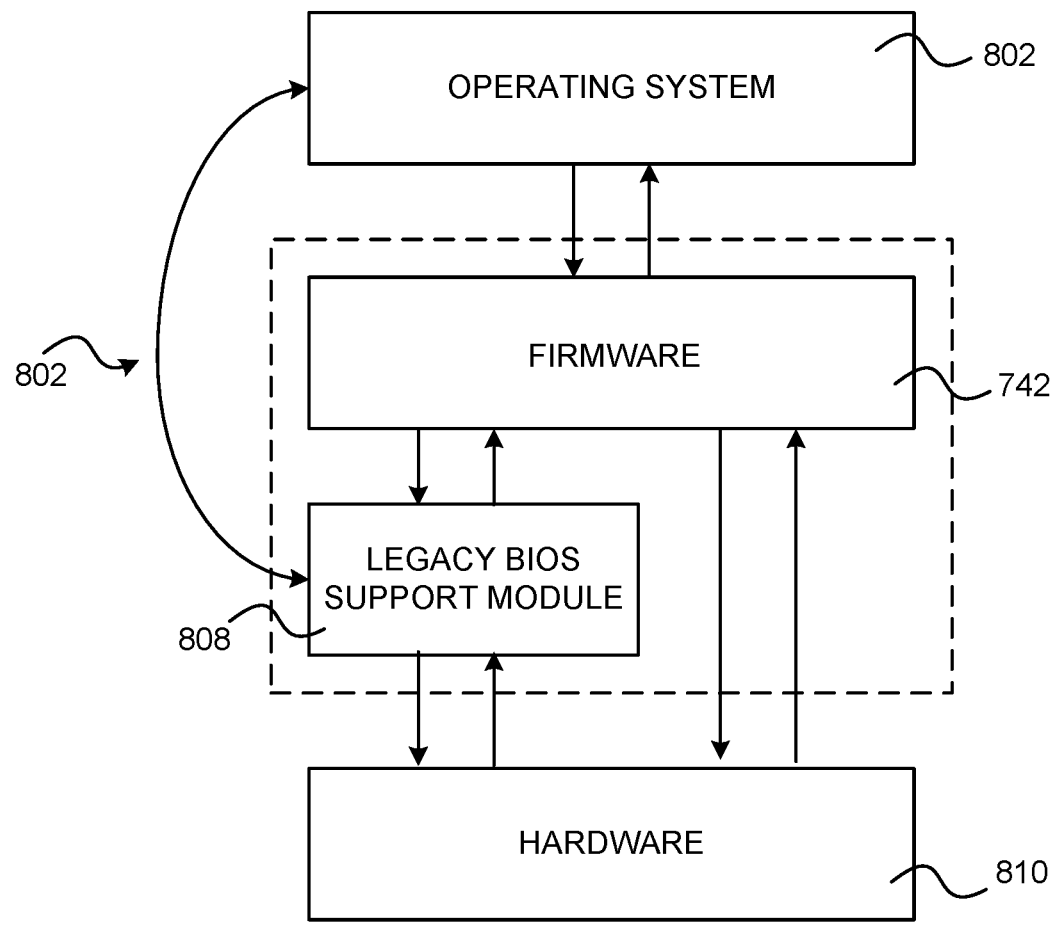
FIG. 8 is a software architecture diagram illustrating aspects of an interface between a UEFI Specification-compliant firmware and an operating system according to one or more embodiments presented herein.

Referring now to FIG. 8, a software architecture diagram will be described that illustrates aspects of an interface between a firmware 742, such as a UEFI Specification-compliant firmware, and an operating system 802 according to one or more configurations presented herein. As described above, a firmware 742 can include a firmware that is compliant with the UEFI Specification or another type of firmware. As mentioned above, the term "UEFI Specification" as used herein refers to both the EFI Specification developed by INTEL CORPORATION and the UEFI Specification managed by the UEFI FORUM.

The UEFI Specification describes an interface between the operating system 802 and the firmware 742. The UEFI Specification also defines an interface that the firmware 742 can implement, and an interface that the operating system 802 can use while booting. How the firmware 742 implements the interface can be left up to the manufacturer of the firmware. The UEFI Specification also defines a way for the operating system 802 and firmware 742 to exchange information necessary to support the operating system boot process.

According to some configurations, both a UEFI-compliant firmware 742 and a legacy BIOS support module 808 can be present. This allows the computer 700 to support a UEFI firmware interface and a legacy BIOS firmware interface. To provide this functionality, an interface 812 can be provided for use by legacy operating systems and applications. According to other configurations, only one of the UEFI-compliant firmware 742 and the legacy BIOS support module 808 are present in the firmware. According to yet other configurations, the firmware 742 can interface with the platform hardware 810 through any of various other architectures, components, or modules for the firmware without specific involvement of the UEFI-compliant firmware or the legacy BIOS support module 808. Additional details regarding the operation and architecture of a UEFI Specification-compliant firmware can be found in the UEFI Specification.

Figure 9:
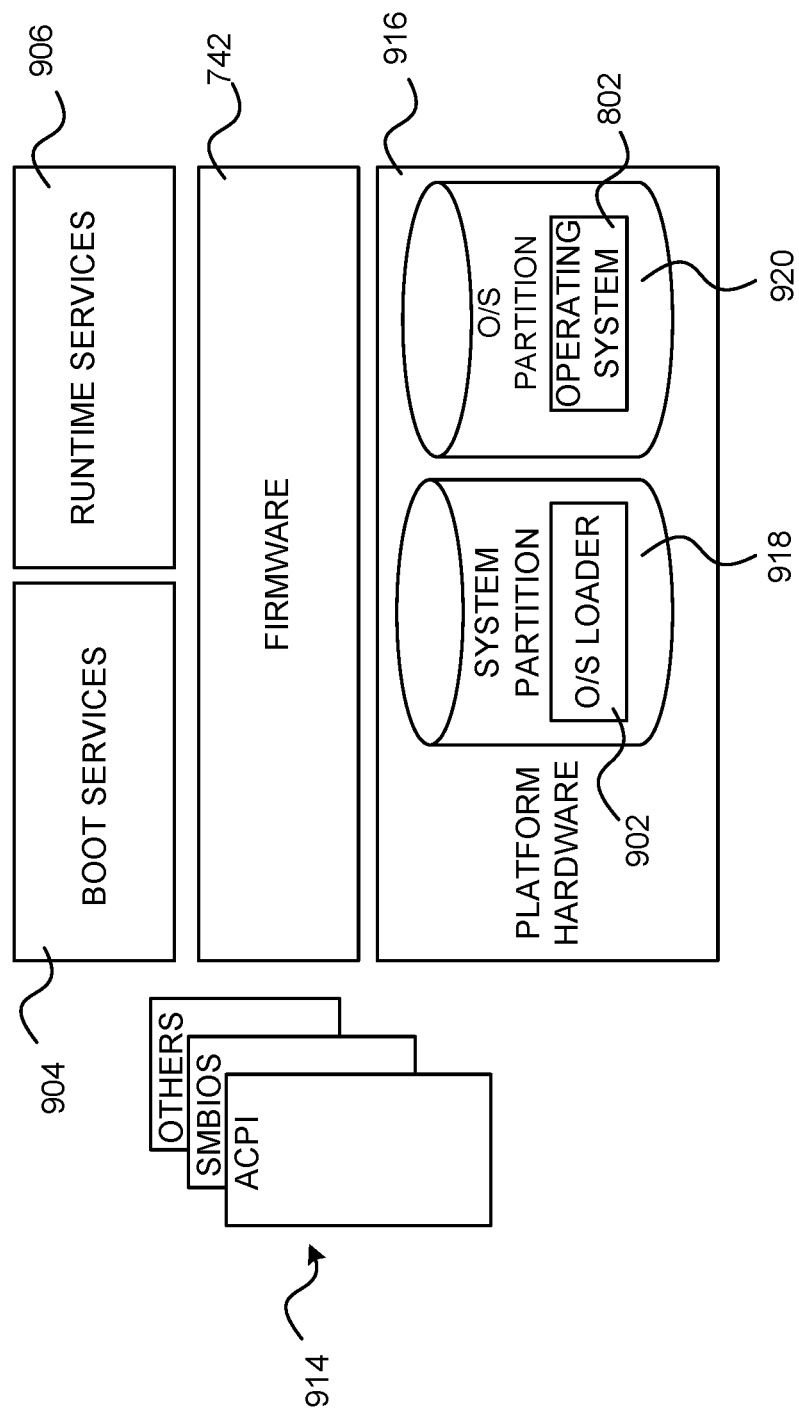
FIG. 9 is a software architecture diagram illustrating an architecture for a UEFI Specification-compliant firmware that provides an operating environment for one or more embodiments presented herein.

Turning now to FIG. 9, a block diagram will be described that illustrates an architecture for a UEFI Specification-compliant firmware that provides an operating environment for one or more configurations presented herein. As shown in FIG. 9, the architecture can include platform hardware 916 and an OS 802. The firmware 742 can retrieve an OS image from the UEFI system partition 918 using a UEFI operating system loader 902. The UEFI system partition 918 can be an architecturally shareable system partition that provides a file system designed to support safe sharing of mass storage between multiple vendors. An OS partition 920 can also be utilized. The UEFI Specification defines the structure of the UEFI system partition 918.

Once started, the UEFI OS loader 902 can continue to boot the complete operating system 802. In doing so, the UEFI OS loader 902 can use UEFI boot services 904 and interface to other supported specifications to survey, comprehend, and initialize the various platform components and the operating system software that manages them. Thus, interfaces 914 from other specifications can also be present on the system. For example, the Advanced Configuration and Power Management Interface ("ACPI") and the System Management BIOS ("SMBIOS") specifications can be supported.

UEFI boot services 904 can provide interfaces for devices and system functionality used during boot time. UEFI runtime services 906 can also be available to the UEFI OS loader 902 during the boot phase. For example, a set of run time services can be presented that support variables, time/date, capsule, reset, and the like. UEFI allows extension of platform firmware by loading UEFI driver and UEFI application images which, when loaded, have access to UEFI-defined runtime and boot services.

It should be appreciated that while the illustrative operating environment presented above has been described primarily in the context of a UEFI Specification-compliant firmware, it is to be understood that the configurations disclosed herein are not limited to use with a UEFI Specification-compliant firmware. Similar configurations can be utilized in other pre-boot firmware execution environments, such as that provided by a firmware compliant with the OPEN FIRMWARE specification, another type of open or proprietary firmware, a legacy BIOS firmware, or other types of firmware.

It should also be appreciated that technologies have been disclosed herein for automatic bus resource adjustment in a multiple root bridge computing system. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations illustrated and described, and without departing from the true spirit and scope of the present invention, which is set forth in the following claims.

The invention claimed is:

1. A non-transitory computer-readable storage medium having computer-executable instructions stored thereupon which, when executed by a processor of a computing device, cause the processor to:
   enumerate buses of a plurality of root bridges; and
   responsive to determining that at least one out-of-resource condition occurred during the enumeration of the buses of the plurality of root bridges,
      determine a number of required buses for each root bridge causing an out-of-resource condition during enumeration of the buses of the plurality of root bridges, and
      reallocate a number of available buses between the plurality of root bridges such that each root bridge is allocated a number of the available buses greater than or equal to the number of required buses, wherein the number of required buses for a first root bridge of the plurality of root bridges causing an out-of-resource condition is determined by:
         enumerating bridge devices coupled to the first root bridge;
         programming primary, secondary, and subordinate bus numbers for a first bridge device coupled to the first root bridge using a plurality of bus numbers to determine the number of required buses for the first bridge device;
         storing data identifying the number of required buses for the first bridge device; and
         clearing the primary, secondary, and subordinate bus numbers for the first bridge device.

2. The non-transitory computer-readable storage medium of claim 1, wherein the number of required buses for a first root bridge of the plurality of root bridges causing an out-of-resource condition is further determined by:
   programming primary, secondary, and subordinate bus numbers for a second bridge device coupled to the first root bridge using the plurality of bus numbers to determine the number of required buses for the second bridge device;
   storing data identifying the number of required buses for the second bridge device; and
   clearing the primary, secondary, and subordinate bus numbers for the second bridge device.

3. The non-transitory computer-readable storage medium of claim 1, having further computer-executable instructions stored thereupon to restart the computing device following the reallocating of the number of available buses between the plurality of root bridges.

4. The non-transitory computer-readable storage medium of claim 1, wherein an equal number of the available buses are allocated to each of the plurality of root bridges during startup of the computing device.

5. The non-transitory computer-readable storage medium of claim 1, wherein the computing device comprises a single processor, wherein the plurality of root bridges are coupled to the single processor, and wherein one of the plurality of root bridges generates an out-of-resource condition during the enumeration of the buses.

6. The non-transitory computer-readable storage medium of claim 1, wherein the computing device comprises a single processor, wherein the plurality of root bridges are coupled to the single processor, and wherein two or more of the plurality of root bridges generate an out-of-resource condition during the enumeration of the buses.

7. The non-transitory computer-readable storage medium of claim 1, wherein the computing device comprises a first processor and a second processor, wherein the first processor is coupled to a first portion of the plurality of root bridges, wherein the second processor is coupled to a second portion of the plurality of root bridges, wherein at least one of the root bridges coupled to the first processor generates an out-of-resource condition during the enumeration of the buses, and wherein at least one of the root bridges coupled to the second processor generates an out-of-resource condition during the enumeration of the buses.

8. The non-transitory computer-readable storage medium of claim 1, wherein the computing device comprises a first processor, wherein the first processor is coupled to a portion of the plurality of root bridges on a first segment and a portion of the plurality of root bridges on a second segment, and wherein at least one of the root bridges on the first segment generates an out-of-resource condition during the enumeration of the buses.

9. A computing system, comprising:
   at least one central processing unit (CPU);
   a first root bridge;
   a second root bridge; and
   a memory device storing instructions which, when executed by the at least one CPU, will cause the computing system to
      enumerate the buses of the first root bridge;
      determine whether an out-of-resource condition occurred during enumeration of buses of the first root bridge;
      if an out-of-resource condition occurred during enumeration of buses of the first root bridge, determine a total number of buses required by the first root bridge;
      enumerate the buses of the second root bridge;
      determine whether an out-of-resource condition occurred during enumeration of buses of the second root bridge;
      if an out-of-resource condition occurred during enumeration of buses of the second root bridge, determine a total number of buses required by the second root bridge; and
      if an out-of-resource condition occurred during enumeration of buses for the first root bridge or the second root bridge,
         reallocate a number of available buses between the first root bridge and the second root bridge such that a number of the available buses allocated to the first root bridge is greater than or equal to the total number of buses required by the first root bridge and such that a number of the available buses allocated to the second root bridge is greater than or equal to the total number of buses required by the second root bridge, wherein determining the total number of buses required by the first root bridge comprises:

enumerating bridge devices coupled to the first root bridge;

programming primary, secondary, and subordinate bus numbers for a first bridge device coupled to the first root bridge using a plurality of bus numbers to determine the number of buses required by the first bridge device;

storing data identifying the number of buses required by the first bridge device; and clearing the primary, secondary, and subordinate bus numbers for the first bridge device.

10. The computing system of claim 9, wherein determining the total number of buses required by the first root bridge further comprises:

programming primary, secondary, and subordinate bus numbers for a second bridge coupled to the first root bridge using the plurality of bus numbers to determine the number of buses required by the second bridge device;

storing data identifying the number of buses required by the second bridge device; and clearing the primary, secondary, and subordinate bus numbers for the second bridge device.

11. The computing system of claim 9, wherein the memory device stores further instructions to restart the computing device following the reallocating of the number of available buses between the first root bridge and the second root bridge.

12. The computing system of claim 9, wherein an equal number of the available buses are allocated to each of the plurality of root bridges during startup of the computing system.

13. The computing system of claim 9, wherein the first root bridge and the second root bridge are coupled to a single CPU.

14. The computing system of claim 9, wherein the first root bridge and the second root bridge are coupled to different CPUs.

15. The computing system of claim 9, wherein the first root bridge is assigned to a first segment and the second root bridge is assigned to a second segment.

16. A computer-implemented method, comprising:

enumerating buses of a plurality of root bridges of a computing system; and responsive to determining that at least one out-of-resource condition occurred during the enumeration of the buses of the plurality of root bridges, determining a number of required buses for each root bridge causing an out-of-resource condition during enumeration of the buses of the plurality of root bridges, and reallocating a number of available buses between the plurality of root bridges of the computing system such that each root bridge is allocated a number of the available buses greater than or equal to the number of required buses, wherein the number of required buses for a first root bridge of the plurality of root bridges causing an out-of-resource condition is determined by:

enumerating bridge devices coupled to the first root bridge;

programming primary, secondary, and subordinate bus numbers for a first bridge device coupled to the first root bridge using a plurality of bus numbers to determine the number of required buses for the first bridge device;

storing data identifying the number of required buses for the first bridge device; and clearing the primary, secondary, and subordinate bus numbers for the bridge devices coupled to the first bridge device.

17. The computer-implemented method of claim 16, wherein the number of required buses for the first root bridge of the plurality of root bridges causing an out-of-resource condition is further determined by:

programming primary, secondary, and subordinate bus numbers for a second bridge device coupled to the first root bridge using the plurality of bus numbers to determine the number of required buses for the second bridge device;

storing data identifying the number of required buses for the second bridge device; and clearing the primary, secondary, and subordinate bus numbers for the second bridge device.

18. The computer-implemented method of claim 16, wherein an equal number of the available buses are allocated to each of the plurality of root bridges during startup of the computing device.

* * * * *